United States Patent [19]

Iwasaki et al.

[11] Patent Number: 6,086,184

[45] Date of Patent: *Jul. 11, 2000

[54] RECORDING CONTROL METHOD AND RECORDING CONTROL APPARATUS, AND RECORDING APPARATUS AND RECORDING SYSTEM USING THE RECORDING CONTROL APPARATUS

[75] Inventors: Osamu Iwasaki, Kawasaki; Naoji Ohtsuka; Kentaro Yano, both of Yokohama; Kiichiro Takahashi, Kawasaki; Daigoro Kanematsu, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/564,875

[22] Filed: Nov. 28, 1995

[30] Foreign Application Priority Data

Nov. 28, 1994 [JP] Japan .................................... 6-293161

[51] Int. Cl.[7] .................................................... B41J 2/145
[52] U.S. Cl. .............................................................. 347/40
[58] Field of Search ................................. 347/40, 41, 5

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,567,570 | 1/1986 | Peer ........................................ 364/900 |
| 4,608,577 | 8/1986 | Hori . |
| 4,723,129 | 2/1988 | Endo et al. . |
| 4,740,796 | 4/1988 | Endo et al. . |
| 4,965,593 | 10/1990 | Hickman .................................... 347/12 |
| 5,121,471 | 6/1992 | Nam ....................................... 395/115 |
| 5,239,312 | 8/1993 | Merna et al. ............................. 347/41 |
| 5,270,728 | 12/1993 | Lund et al. ................................ 347/5 |
| 5,719,601 | 2/1998 | Moore et al. .............................. 347/9 |

FOREIGN PATENT DOCUMENTS

| | | |
|---|---|---|
| 54-56847 | 5/1979 | Japan . |
| 58-194541 | 11/1983 | Japan ..................................... 347/41 |
| 59-123670 | 7/1984 | Japan . |
| 59-138461 | 8/1984 | Japan . |
| 60-71260 | 4/1985 | Japan . |
| 60-107975 | 6/1985 | Japan . |
| 5-037850 | 2/1993 | Japan . |
| 5-145678 | 6/1993 | Japan . |
| 5-183913 | 7/1993 | Japan . |

*Primary Examiner*—N. Le
*Assistant Examiner*—Michael Nghiem
*Attorney, Agent, or Firm*—Fitzpatrick, Cella, Harper & Scinto

[57] ABSTRACT

A recording system and a recording method which can perform the recording operation without increasing an image storage capacity of a recording apparatus even if image data is increased with an increase in a recording resolution. Picture element data of image data is split into a plurality of split picture element data by a specific pattern. The plurality of split image data are transferred with offsetting each of the split picture element data. The offset and transferred split picture element data are held by a storage means. The split picture element data held by the storage means are controlled so as to be recorded on a recording medium at positions where the above-described picture element split processing is not subjected thereto.

48 Claims, 24 Drawing Sheets

MAIN SCANNING DIRECTION

RECORDING CONTROL METHOD AND RECORDING CONTROL APPARATUS, AND RECORDING APPARATUS AND RECORDING SYSTEM USING THE RECORDING CONTROL APPARATUS

BACKGROUND OF THE INVENTION

1. Field of the Invention

The present invention relates to a recording apparatus which records images on a recording medium based on recording image data, more particularly, to a method and means for transferring and storing the recording image data, and further, to a method and means for printing the stored data.

2. Description of the Reacted Art

Recently, with the spread of personal computers, word processors and facsimile machines in offices, printers of various recording systems have been developed as output terminals of these apparatuses. A serial printer performing a recording operation for each line can record characters and images. Particularly, the serial printer is suitable for printing characters at high speed by allowing a recording width for every line to correspond to the size of the character. The serial printer develops a line of printing information from image data in a memory, and forms a recording image by scanning recording elements with respect to a recording medium based on the developed recording image data.

With the spread of multi-media in recent years, the information handled by computers has extended even to natural images and voices in addition to characters, and in a recording apparatus which is one of the output terminals, the opportunity of recording not only character/letter but also image/graphic image such as natural image has been increased.

With such technological development as described above, a high resolution of the recording has come to be required in order to perform image recording with high definition. In the case of recording the image/graphic image, it is necessary to perform the recording operation with a resolution higher than that of printing of character/letter.

The conventional recording apparatus is provided with a storage means such as a memory in order to store recording data for a predetermined recording area. When the recording operation of higher resolution is performed, the number of the picture element data to be recorded will increase, and the recording area to be recorded by recording data stored in the memory having the same storage capacity is smaller than that of a low resolution of the recording operation. Therefore, the storage capacity of the conventional memory may be insufficient when performing the high resolution of the recording operation.

The cost of a readable/writable memory device (RAM: random access memory) depends on the storage capacity. Since the cost of the memory device increases with the storage capacity, the use of the memory device of high storage capacity may lead to an increase in cost and such a memory device is not suitable for a printer of personal use.

SUMMARY OF THE INVENTION

The present invention has been made in consideration of the above-mentioned problems, and has as its objective to provide a recording method and a recording apparatus which can perform the high resolution recording operation without increasing the storage capacity of the main body of the recording apparatus.

According to an aspect of the present invention, there is provided a recording system which comprises picture-element data splitting means for splitting picture element data of image data by a specific pattern; split offset transfer means for offsetting and transferring the image data split by the picture-element data splitting means for every split picture element data; storage means for storing the split picture element data transferred by the split offset transfer means; and recording means for recording the split picture element data stored in the storage means on a recording medium at positions of the picture elements where the split picture-element processing is not subjected thereto.

According to another aspect of the invention, there is provided a recording control method in a recording apparatus using a recording head having a plurality of recording elements arranged thereon and driving the recording elements while scanning the recording head in the direction of main scanning based on recording data held by recording data holding means to form dots on a recording medium, the recording control method comprises: a first transfer step for transferring recording data to be recorded of odd column alone to the recording data holding means; a first record step for allowing the recording apparatus to perform the recording operation at predetermined dot intervals based on the recording data held by the recording data holding means; a second transfer step for transferring recording data to be recorded of even columns alone to the recording data holding means; and a second record step for allowing the recording apparatus to perform the recording operation at the predetermined dot intervals and with offsetting the recording positions in the direction of main scanning by intervals fewer than the above predetermined dot intervals with respect to the recording position recorded by the first recording step.

According to the above configuration, a recording system and a recording method capable of increasing a resolution can be provided without allowing a recording apparatus to increase a storage capacity of storage element thereof storing recording images. Here, the split offset transfer means is a means for recording the split images at a predetermined resolution and transferring the split images in such a manner that they complement one another to effect an image recording at the resolution higher than the predetermined one.

BRIEF DESCRIPTION OF THE DRAWINGS

FIGS. 14A to 14C are views each showing a storing condition of picture elements of a print buffer during each scanning according to an embodiment of the present invention, in which numbers indicate picture element data to be referred in each of the driving timing of the recording elements;

FIGS. 19A to 19C are views of a storing condition of picture elements of a print buffer during each scanning according to an embodiment of the present invention, in which numbers indicate picture element data to be referred in each of the driving timing of the recording elements;

DETAILED DESCRIPTION OF THE PREFERRED EMBODIMENTS

The preferred embodiments of the present invention will now be described in detail with reference to the accompanying drawings.

A recording apparatus suitable for the embodiments of the present invention will be described with reference to FIGS. 4 and 5.

Figure 4:
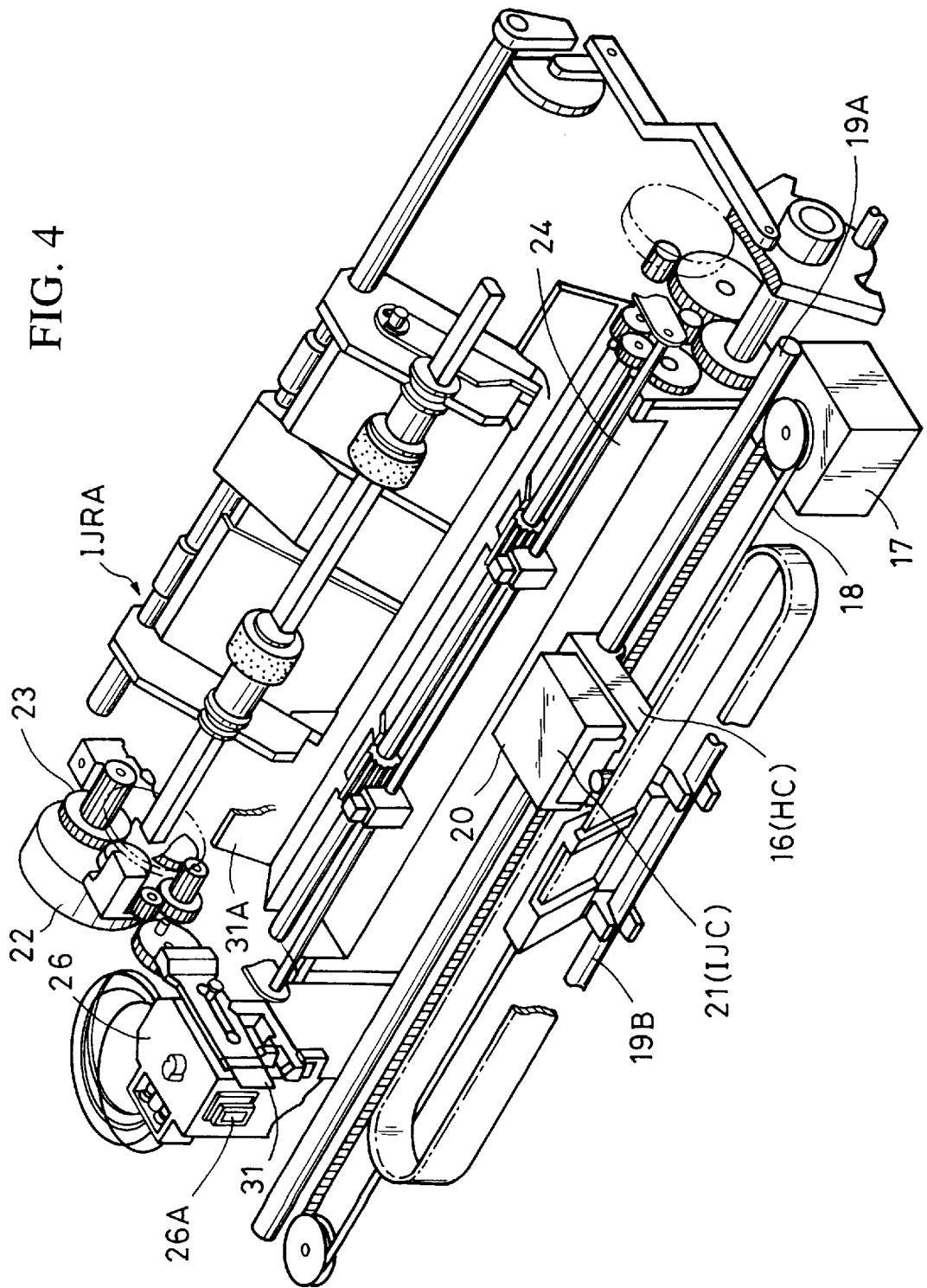
FIG. 4 is a schematic perspective view showing a structure of a recording apparatus to which the present invention is applicable.

FIG. 4 is a schematic perspective view showing a structure of an ink-jet recording apparatus according to one embodiment of the present invention.

As shown in FIG. 4, normal/reverse rotation of a drive motor 17 is transmitted to a carriage 16 by a drive belt 18 so that the carriage 16 is reciprocated along guide shafts 19A and 19B. The reciprocating motion of the carriage is referred to as a main scanning. The carriage 16 is equipped with an ink-jet cartridge (IJC) 21 including an ink tank containing a recording ink which is integral with a recording head ejecting the ink to a recording paper (not shown). A recording head 20 is provided with recording elements which opposes to a recording surface of a recording medium fed on a platen 24 and performs recording. The platen 24 is provided so as to oppose the ink-jet cartridge 21. The recording paper (not shown) carried by a drive motor 22 is pressed by the platen 24 at its side opposing the ink-jet cartridge 21 and held so that a predetermined spacing is formed between the ink-jet cartridge 21 and the recording paper. A recording operation to eject the ink from the recording head while moving the carriage 16 by the motor 17 is performed on the basis of a command from a recording control means (not shown). The recording control means may be a microprocessor, read only memory and random access memory arrangement for print heads such as disclosed in U.S. Pat. No. 4,567,570 issued to Thomas R. Peer on Jan. 28, 1986. During moving of the carriage, the recording head 20 records an image responsive to data received. For each completion of the one main scanning, the recording medium is carried in the predetermined amount. The movement of the recording medium due to carrying is referred to as a sub-scanning.

A recovery unit 26 is provided outside the range of a recording operation in the reciprocating action of the ink-jet cartridge 21. An ejection outlet for ejecting the ink is formed in the recording head 20, and the ejection outlet is opposed to a capping means 26A of the recovery unit 26 so that recovery operation for removing thickened ink and bubbles in the recording head by suction and preliminary ejection is performed. In addition, when the recording apparatus is not used, evaporation and thickening of the ink in the ejection outlet is prevented and the recording head is protected by performing the capping by the use of the capping means 26A. Furthermore, a cleaning blade 31 is provided aside the capping means 26A in such a state that it is supported so as to project toward the ink-jet cartridge 21, so that it can come into contact with the ejection outlet of the front of the recording head. This allows the cleaning blade 31 to stand projected to the moving course of the ink-jet cartridge 21 after completion of the recovery operation so as to perform wiping of the front of the recording head 20 as the movement of the ink jet cartridge 21. By the wiping operation, stains of the ejection outlet face, such as droplets of ink, are wiped out.

Figure 5:
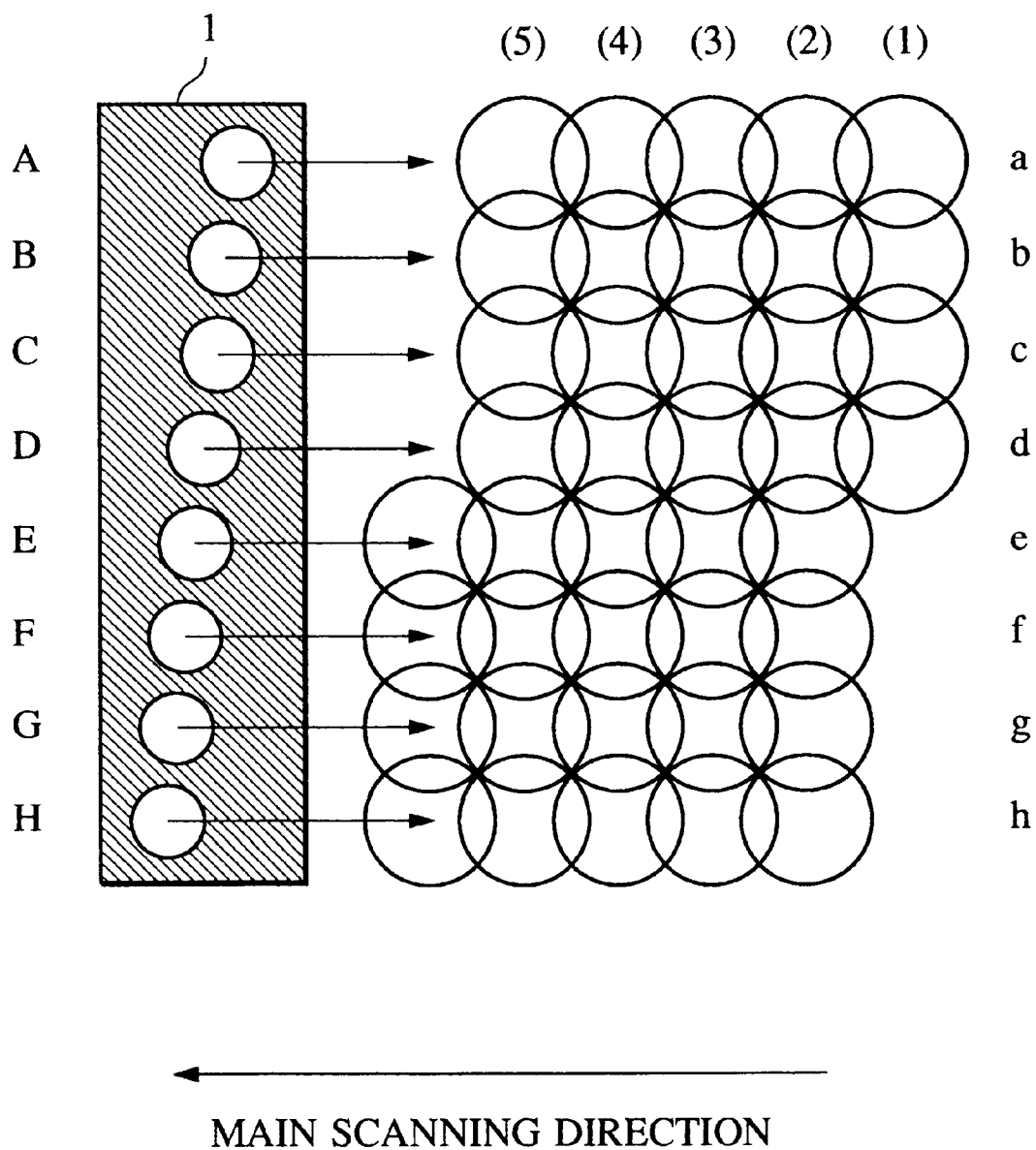
FIG. 5 is a schematic diagram showing an arrangement of ejection outlets and recorded dots in a recording apparatus to which the present invention is applicable.
Figure 6A:
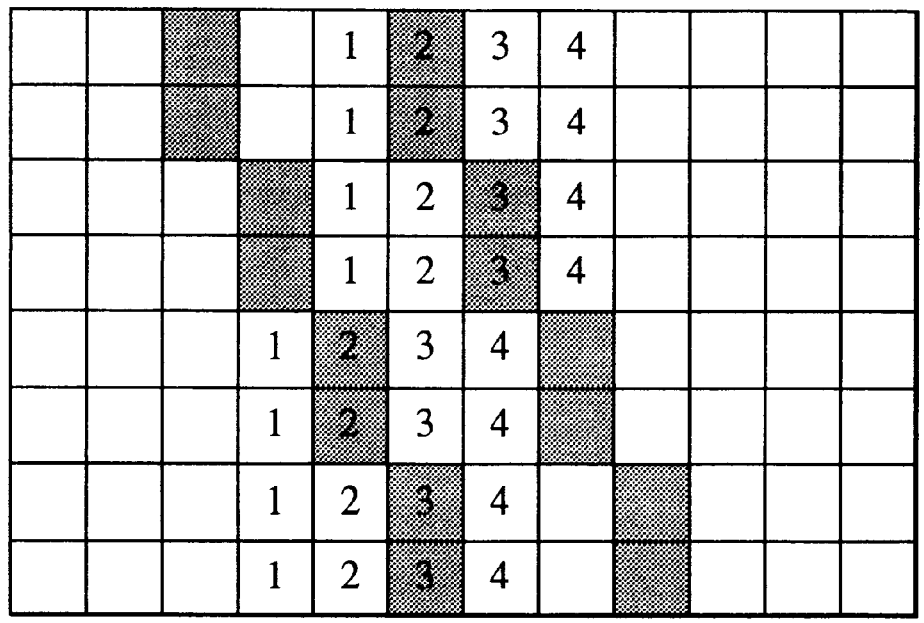
FIGS. 6A and 6B show data of a print buffer and driving timing of recording elements, respectively when 360 dpi recording operation is performed.
Figure 6B:
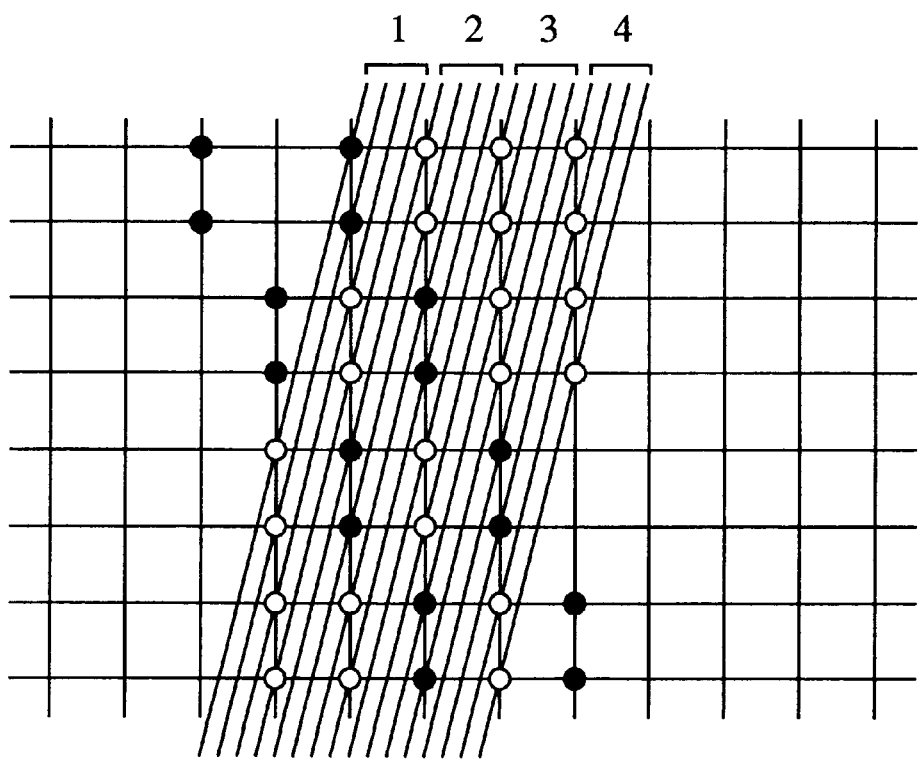

FIG. 5 shows an arrangement of the ejection outlets (A to H) and recording dots ejected therefrom in a recording apparatus to which the present invention is applicable. Recording elements corresponding to each of the ejection outlets (A to H) are disposed on a recording head to be applied to the embodiments of the present invention. By driving the recording elements corresponding to each of the ejection outlets, dots (a to h) corresponding to each of the ejection outlets are formed on a recording medium.

A recording head 1 is constituted so that it is mounted on a carriage and subjected to a record scanning (main scanning) to perform recording and each of the recording elements allow a plurality of dots (columns (1) to (5) in FIG. 5) to be formed.

Generally, in a recording head of a printer, the number of the recording elements to be driven at a time is reduced to limit power consumption. Thus, a method is adopted where a plurality of recording elements are divided into a plurality of blocks to be driven in order. This driving is referred to as time sharing driving. In a serial printer, since the recording operation is performed while scanning the recording head, the dots are formed to offset obliquely from the direction of the arrangement of the recording elements when the time sharing driving is performed. Thus, a construction is adopted in which the recording elements and the ejection outlets of the recording head are arranged so as to be inclined with respect to a line direction so that columns of the dots are not formed with inclination. The ejection outlets in FIG. 5 are also arranged so as to be inclined with respect to the line direction.

According to the construction of the recording head shown in FIG. 5, the recording elements are driven so that droplets of the ink are ejected simultaneously from two ejection outlets in order to separate the ink ejection from all of the ejection outlets into four stages. In FIG. 5 the ejection outlets A and E, B and F, C and G, and D and H are driven, respectively so that the droplets of the ink are ejected therefrom simultaneously, and the driving operation of the recording elements corresponding to each group of the ejection outlets is performed. As mentioned above, since the recording elements of the recording head are arranged to be inclined, the dots to be recorded of the ejection outlets A to D and those of the ejection outlets E to H offset one line from each other in the line direction. Therefore, data offset one line between the groups of the ejection outlets A to D and E to H will be transferred.

A principal system configuration of the present invention will be described with reference to a block diagram of FIG. 1. Recording image data acquired by an image data acquisition means 1000 is split for each picture element with a picture-element splitting means. The image data acquisition means corresponds to an input portion into which the image data is inputted and to reading means for reading a present image.

The picture-elements split by the aforementioned picture element split means 1001 are managed as a split image 1 of 1002 and as a split image 2 of 1003. These images are transferred by dividing a transfer timing of the data in an offset transfer means 1004. Then, the split images are forwarded to an image data input means 1006 through an interface 1005. The forwarded images are loaded as output images into an output image storage means 1007 and stored therein. The stored split picture element data are recorded on a recording medium by an image recording means at positions where the picture-element split processing is not subjected thereto. Recording, splitting and reading of picture elements in recording systems are well known. As examples, the transfer of color image data is disclosed in Japanese Patent Document No. JP 5183913 (Kensuke) published Jul. 23, 1993. Japanese Patent Document No. JP 5145678 (Hiroke) published Jun. 11, 1993 discloses printing arrangements in which character codes and picture data are separated and then transmitted and Japanese Patent Document No. JP 5037850 (Sadafumi) published Feb. 12, 1993 discloses automatically adjusting timing to obtain higher picture quality in a picture processing system.

In the embodiments of the present invention, the unit of the picture element of the image data to be recorded in the longitudinal direction (direction of the sub-scanning) is referred to as a raster, and the unit of the same in the lateral direction (direction of the main scanning) is referred to as a column.

First Embodiment:

A first embodiment of the present invention will now be described.

In this embodiment, the image data are recorded at a high resolution of 360 dpi (dots per inch) high and 720 dpi wide using a recording head having recording elements arranged thereon corresponding to a resolution of 360 dpi. The longitudinal direction is the direction of the sub-scanning which approximately matches the direction in which the recording elements are arranged. The lateral direction means the direction of the main scanning in which the recording head is scanned. The size of a print buffer shall be 8 dots (longitudinal)×12 dots (lateral), and for simplification, the recording elements will be described only for 8 rasters.

Figure 7A:
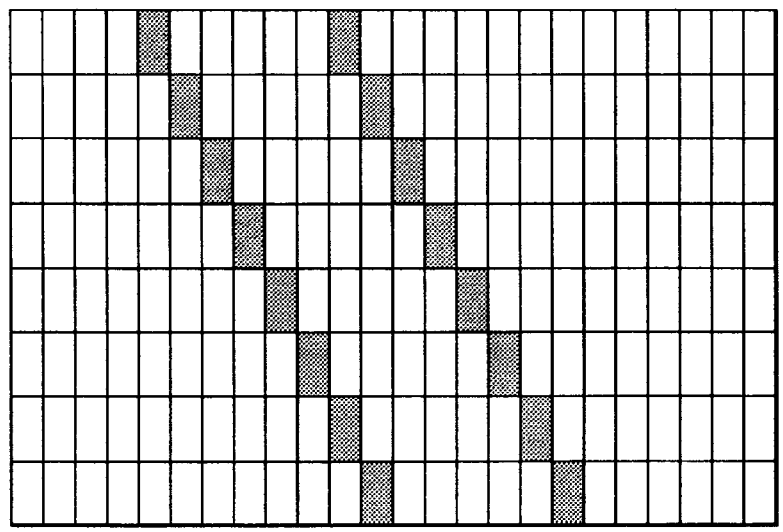
FIGS. 7A to 7C are views each showing a method of splitting the picture elements according to an embodiment of the present invention.

FIG. 7A shows a recording image of 8 dots high by 24 dots wide.

Figure 7B:
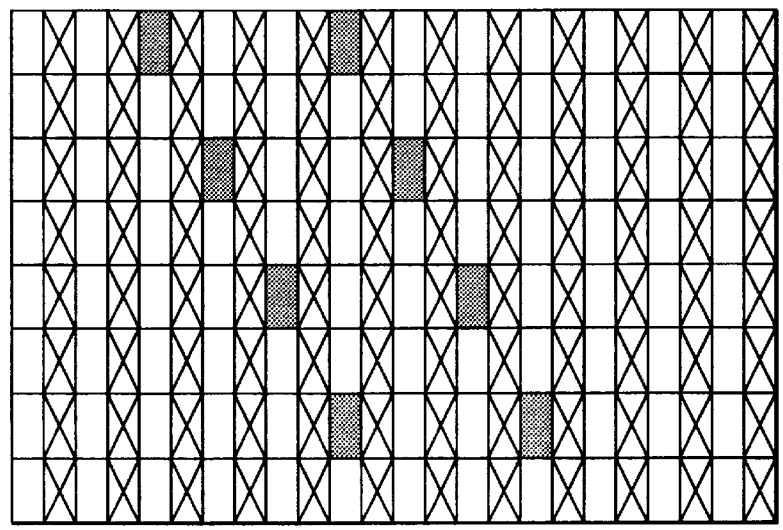

Firstly, the image of FIG. 7A is stored as data of 8 dots high by 12 dots wide in the print buffer by eliminating even columns from the left thereof, as shown in FIG. 7B.

Figure 8A:
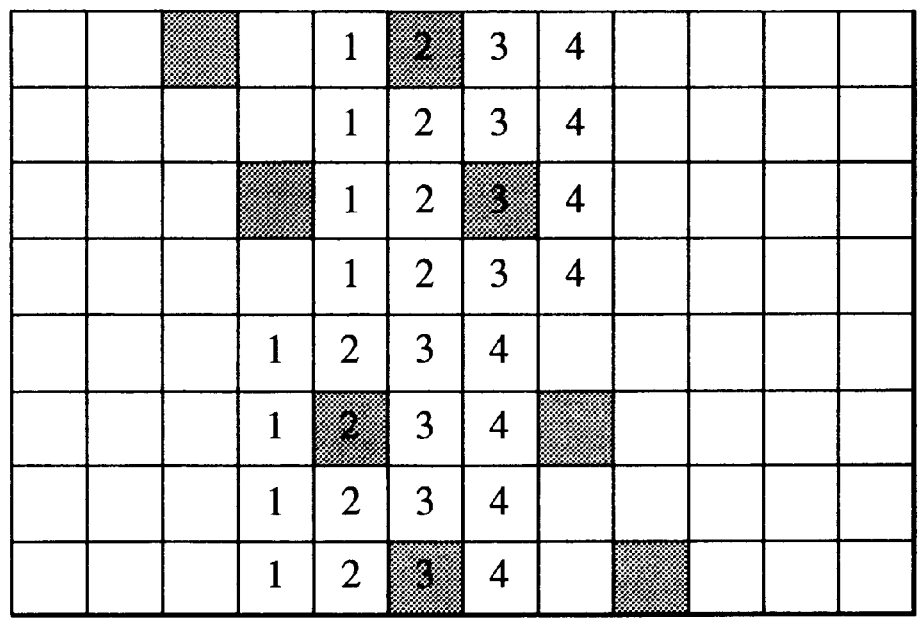
FIGS. 8A and 8B are views showing data of a print buffer when scanning odd columns and a driving timing of recording elements, respectively, according to an embodiment of the present invention.
Figure 8B:
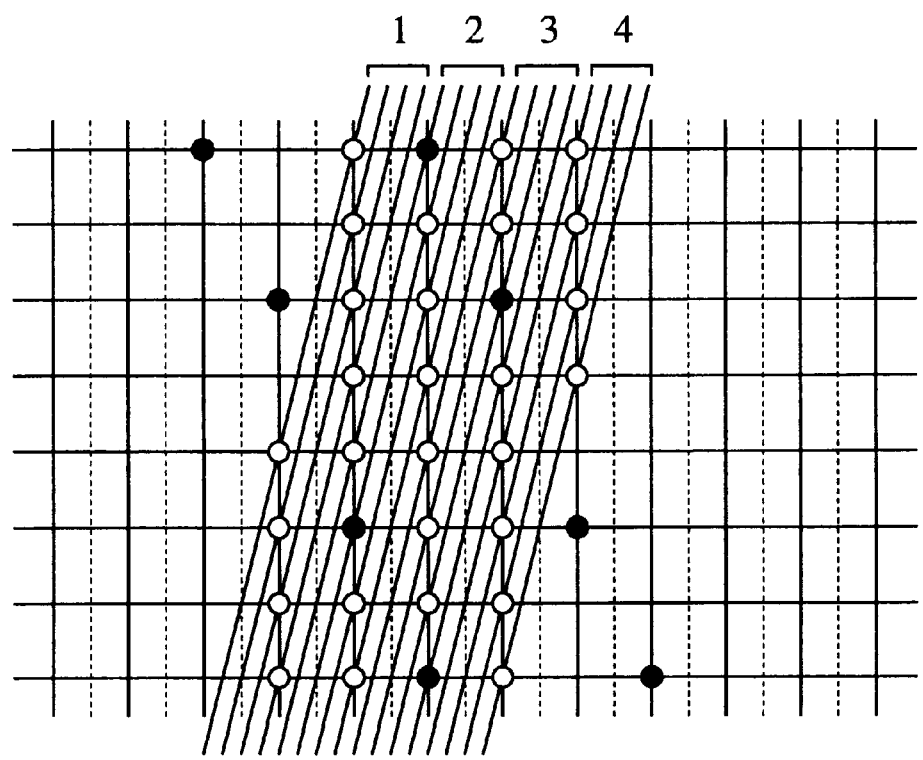

Next, recording of the data stored in the print buffer will be described using FIGS. 8A and 8B. FIG. 8A shows data stored in the print buffer with the process shown in FIG. 7B. FIG. 8B shows timing for recording the data stored in the print buffer as shown in FIG. 8A on a recording medium by the use of the recording elements. Referring to FIG. 8B, lattice-like solid lines indicate 360 dpi recording positions on the recording medium, dotted lines indicate 720 dpi printing positioned between 360 dpi, sloped solid lines indicate trains of the recording elements of the recording head, open circles indicate driving timing of the recording elements and black points indicate dots recorded by the scanning of this time. The numbers assigned to the record scanning of FIG. 8B are recorded with reference to data having the number assigned to the print buffer shown in FIG. 8A. In this way, the dots positioned at 360 dpi lattice points are recorded with the data stored in the print buffer as shown in FIG. 7B.

Figure 7C:
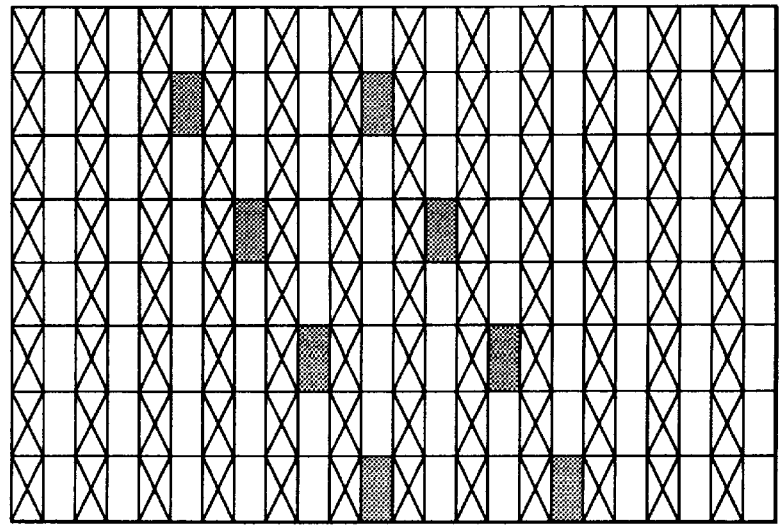
Figures 9A, 9B:
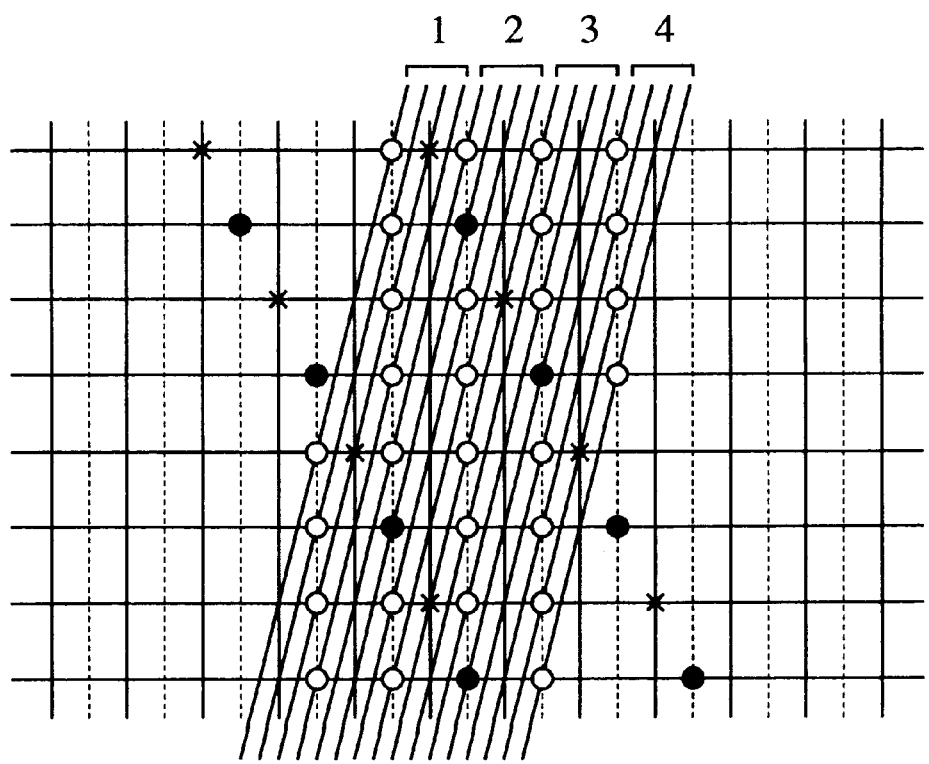
FIGS. 9A and 9B are views showing data of a print buffer when scanning even columns and a driving timing of recording elements, respectively, according to an embodiment of the present invention.

Then, the image of FIG. 7A is stored as data of 8 dots high by 12 dots wide of FIG. 9A in the print buffer by eliminating odd columns from the left thereof, as shown in FIG. 7C.

Recording with the data processed as shown in FIG. 7C and stored in the print buffer will now be described with reference to FIGS. 9A and 9B. FIG. 9A shows data processed as described above and stored in the print buffer. FIG. 9B shows timing for recording the data stored in the print buffer on a recording medium by the use of the recording elements. Referring to FIG. 9B, similar to FIG. 8B, lattice-like solid lines indicate 360 dpi recording positions on the recording medium, dotted lines indicate 720 dpi printing positioned between 360 dpi, sloped solid lines indicate trains of the recording elements of the recording head, open circles indicate driving timing of the recording elements and black points indicate dots recorded by the scanning of this time. Crosses in FIG. 9B indicate dots recorded by the preceding scanning. The recording by scanning of the number 1 of FIG. 9B is performed with reference to the data assigned the number 1 of the print buffer shown in FIG. 9A. The recording by the scanning of the numbers 2 to 4 of FIG. 9B are performed by driving the recording elements with reference to the data 2 to 4 of the print buffer shown in FIG. 9A similar to the recording with scanning of the number 1. The recording by the scanning is controlled so that the driving positions of the recording elements are offset 1/720 inch to the right with respect to the preceding recording operation.

In the scanning of each number of FIG. 8B, the driving timing of the recording elements is offset by the known time sharing driving to reduce the number of the recording elements to be driven simultaneously.

By the operation as described before to divide the image of 360 dpi×720 dpi into the odd columns and the even columns and to record the images of 360 dpi×360 dpi by offsetting 1/720 inch with the data recorded in the odd columns and the even columns at two-time scanning, the high resolution of the recording is accomplished without increasing the capacity of the print buffer.

Figure 10:
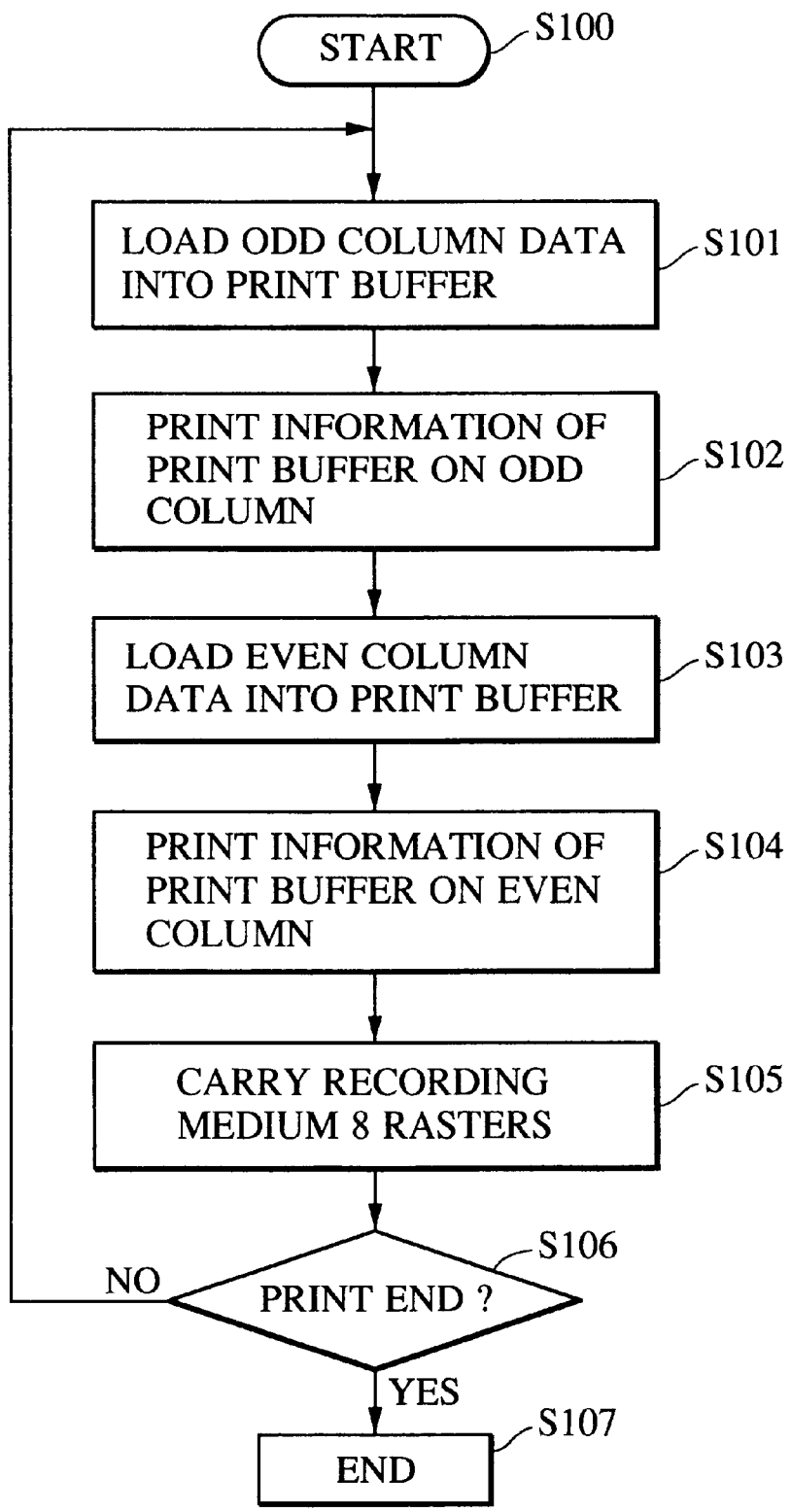
FIG. 10 is a flowchart showing a processing of a main body side of a recording apparatus according to an embodiment of the present invention.

The operation of the recording apparatus during the foregoing processing will be described with reference to FIG. 10.

In step S100, printing is started. Firstly, in step S101, the image data of the odd columns is loaded into the print buffer and stored therein. In step S102, the data stored in the print buffer is recorded on the recording medium at the positions of the odd columns. In step S103, the image data of the even columns is loaded into the print buffer and stored therein. In step S104, the data stored in the print buffer is recorded on the recording medium at the positions of the even columns. That is, the recording elements are driven so as to record the data at the position where the driving timing thereof is shifted one picture element in 720 dpi in the scanning direction from the driving timing of the recording elements driven in step S102. In step S105, the recording medium is carried by only 8 rasters. The carrying amount of the recording medium will be equal to the maximum width (sub-scanning direction) thereof on which the data can be recorded by one scanning. Whether the printing is ended is judged in step S106. The procedure returns to step S101 to perform printing when there is remaining data to be printed. When printing is ended, the procedure is terminated in step S107.

Figure 11:
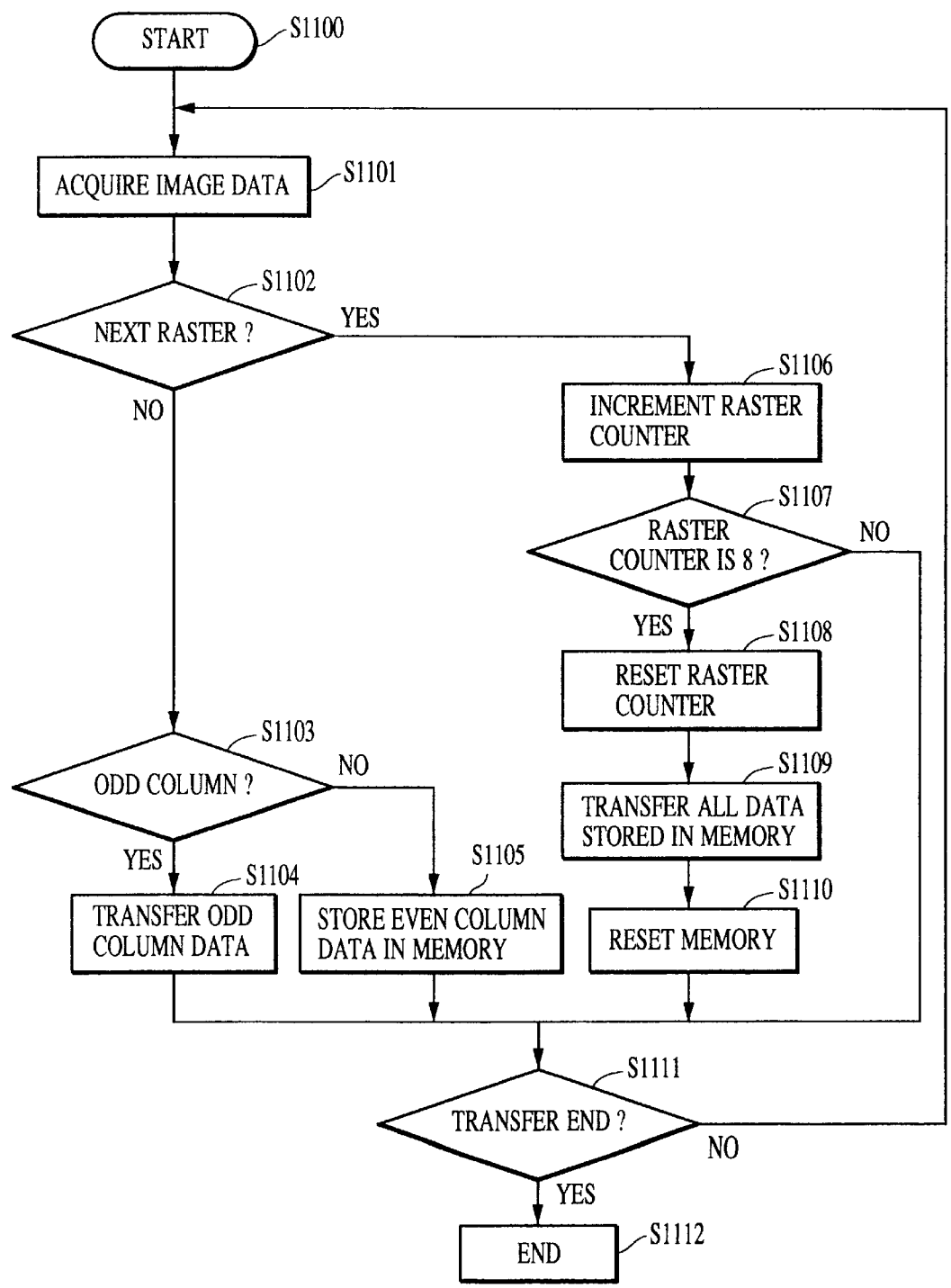
FIG. 11 is a flowchart showing a processing of a image data transfer side according to an embodiment of the present invention.

The processing of the recording image transfer side will now be described with reference to FIG. 11.

Firstly, the recording image data is acquired in the step S1101, and whether a new raster is to be started is judged in step S1102. If the new raster is not started, a procedure advances to step S1103 to judge whether the picture elements of the recording image data are of odd columns. When it is judged in step S1103 that the picture elements of the recording image data are of the odd columns, the odd column data is transferred as picture element data to the recording apparatus in step S1104. When it is judged in step S1111 that data transfer is not ended, the procedure returns to step S1101. When it is judged in step S1103 that the picture elements of the recording image data are of the even columns, the even column data are stored in a memory of the recording image transfer side and the procedure returns to step S1101.

It is necessary only that the processing of steps S1103, S1104 and S1105 transfer the odd columns image data as a print instruction and store the even columns image data in the memory. The processing does not have to make judgement for each picture element as shown in step S1103.

When it is judged in step S1102 that a new raster is started, the procedure advances to step S1106 to increment a raster counter. Whether the value of the raster counter is 8 is judged in step S1107. That is, the step S1107 judges whether data transfer of the odd columns reaches one scanning of the recording elements, and the branch condition due to the count value is decided by the width of the picture element in the direction of the sub-scanning to be recorded at one scanning. When it is judged in step S1107 that the count value of the raster counter is not 8, the procedure returns to step S1101. When it is judged in step S1107 that the count value of the raster counter reaches 8, the procedure advances to step S1108. In step S1108, the raster counter is reset to zero, and the procedure advances to step S1109. In step S1109, all 8 rasters of images of the even columns stored in the memory of the recording image transfer side are transferred to the recording apparatus. In step S1110, the memory is reset, and when it is judged that data transfer is not ended, the procedure returns to step S1101. The processing shown in each of FIGS. 10 and 11, may be performed by stored instruction codes corresponding to the sequence of steps set forth therein as is well known using, for example, microprocessor arrangements illustrated in aforementioned U.S. Pat. No. 4,567,570.

According to the embodiment as described above, data transfer is controlled in one raster. However, it is only necessary for a judgement as to whether the data transfer reaches one scanning of the recording medium. Thus, in the case of this embodiment, data is transferred in 8 rasters.

Figure 3:
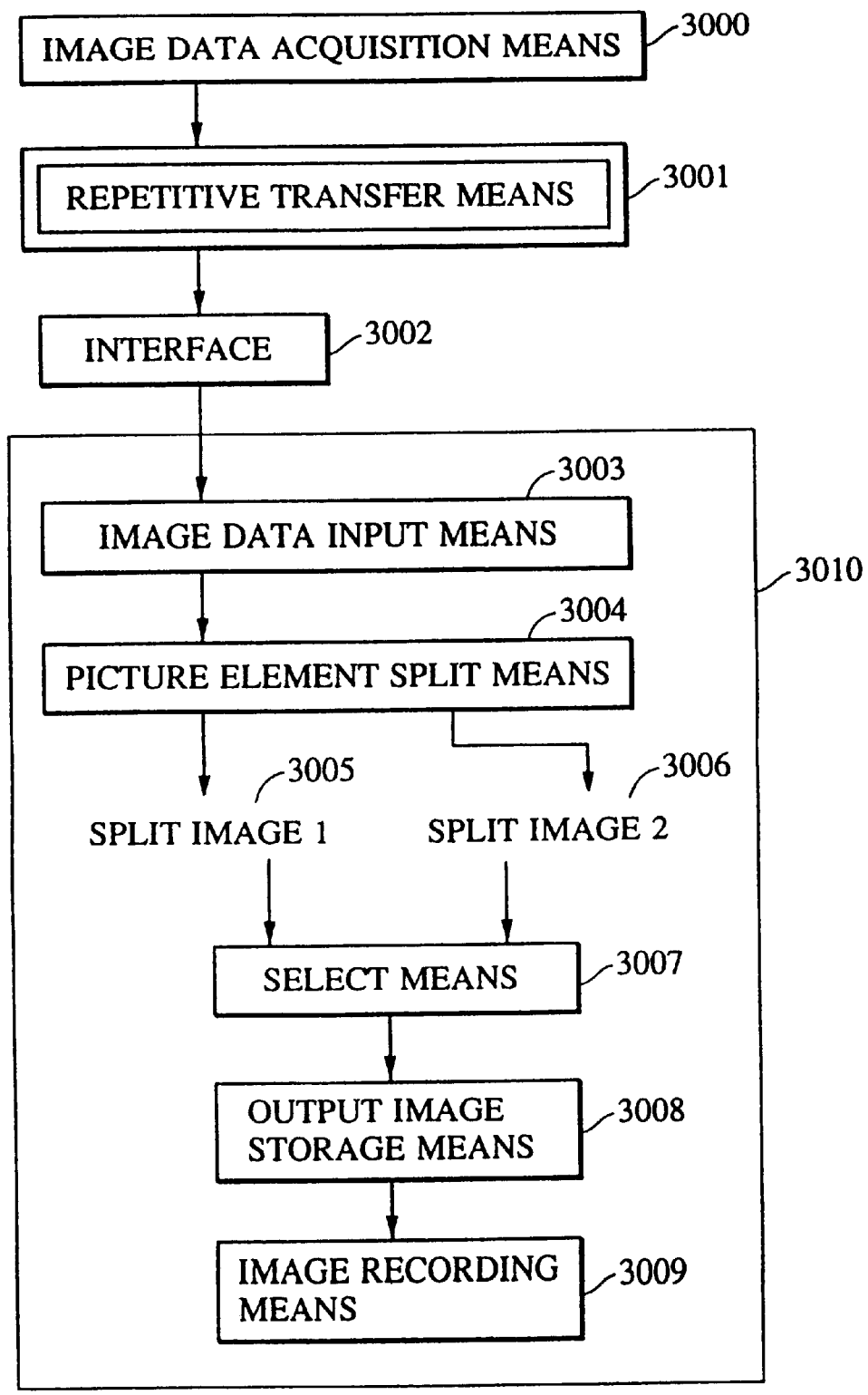
FIG. 3 is a block diagram showing a configuration of an image transfer means in which a picture-element splitting means is employed in a main body of a recording apparatus shown according to an embodiment of the present invention.

In addition, in the embodiment as described above, picture element splitting is performed at the image data transfer side such as a host. However, as shown in FIG. 3, the picture element splitting may be performed at the main body side of the recording apparatus with the provision of the picture-element splitting means. An example of splitting the recording image data into two data at the main body side of the recording apparatus will be described with reference to FIG. 3.

As shown in FIG. 3, in the case of performing picture element splitting at the main body side of the recording apparatus, a repetitive transfer means 3001 which repeats transferring of one scanning data two times is required at the image transfer side. At the main body side of the recording apparatus, a necessary split image among the images split by the picture-element splitting means is selected by a select means 3007. The necessary split image is stored in an output image storage means 3008, which is a print buffer, by the select means 3007. An image recording means 3009 performs the recording operation based on the image data stored in the print buffer. The split images 1 and 2 are recorded by the image recording means 3009 respectively to accomplish the recording of the image acquired by the image data acquisition means.

As described above, by splitting the picture elements at the main body side of the recording apparatus as shown in FIG. 3, it is possible to perform the recording operation which is similar to the foregoing example.

As described above, according to the present invention, by splitting and transferring the picture element data to the image storage means of the main body of the recording apparatus, and forming the images by a plurality of record scanning with the use of the split images, the high resolution of the recording is possible without increasing the image storage capacity of the main body of the recording apparatus.

Second Embodiment:

A second embodiment of the present invention will now be described with reference to the drawings.

In the first embodiment as described above, the scanning positions of the recording elements on the recording medium are changed after completing the recording images by scanning the recording elements. However, this embodiment is characterized in that the high resolution of the printing is performed by changing the scanning positions of the recording elements on the recording medium for every scanning.

In this embodiment, the image data to be recorded is the same as that of shown in FIG. 7A, and this embodiment will be described with an example of the data to be recorded having no dots to be recorded on the image 4 dots high and 24 dots wide at the above and below positions of the image similar to that of FIG. 7A. The construction of the recording apparatus to be applied to this embodiment is the same as that of the first embodiment, and explanation thereof will be omitted.

Figure 12:
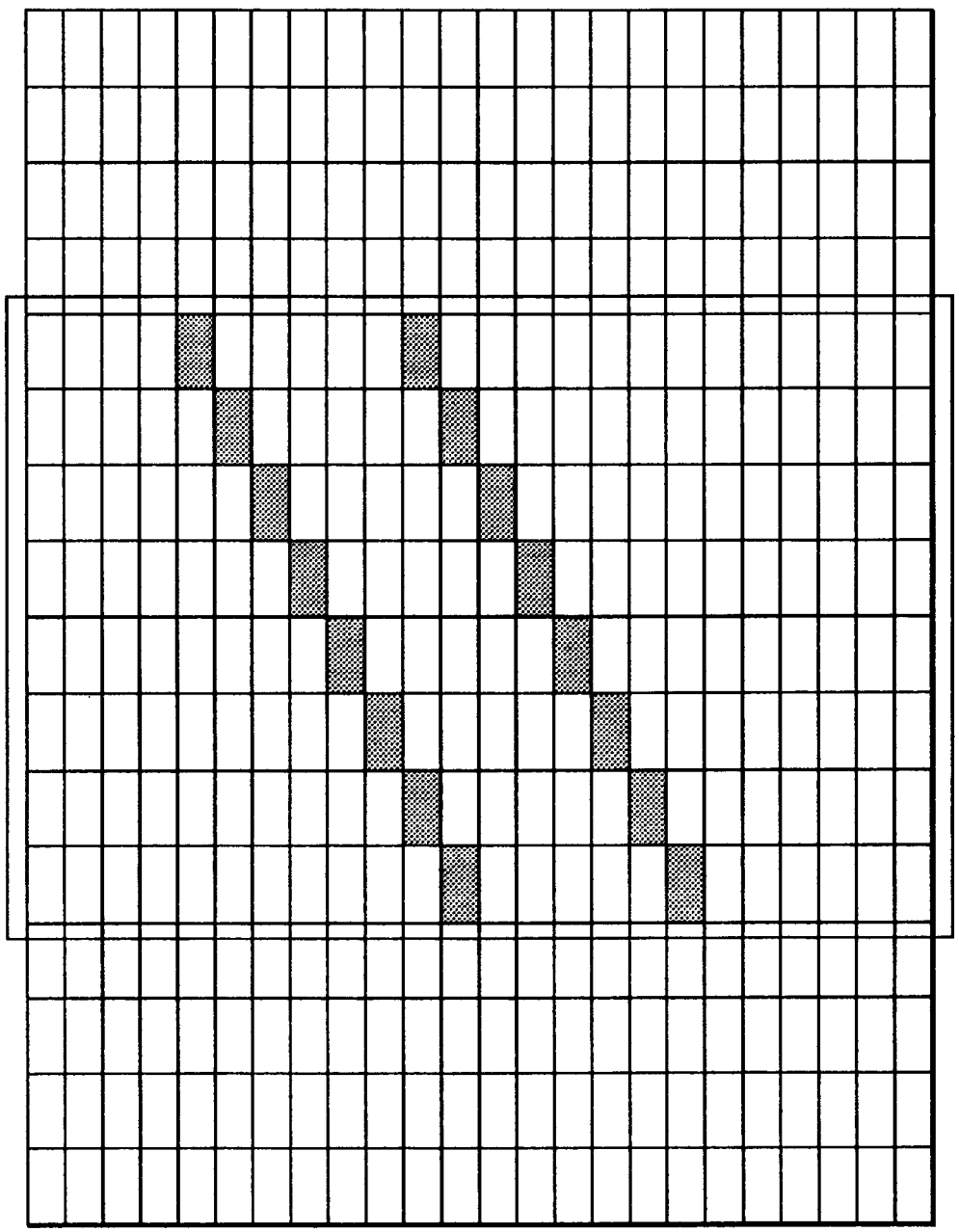
FIG. 12 is a view showing recording image data used for explanation of an embodiment according to the present invention.

In this embodiment, the recording image shown in FIG. 12 is split into every 4 rasters to obtain the images shown in FIGS. 13A, 13B, 13C and 13D. The picture element data with a sloped line in each image area shown in FIGS. 13A to 13D is stored in the memory to output other portions, the images of each of the image areas of every 4 rasters are read out and then, the images stored in the memory are outputted.

Figure 16A:
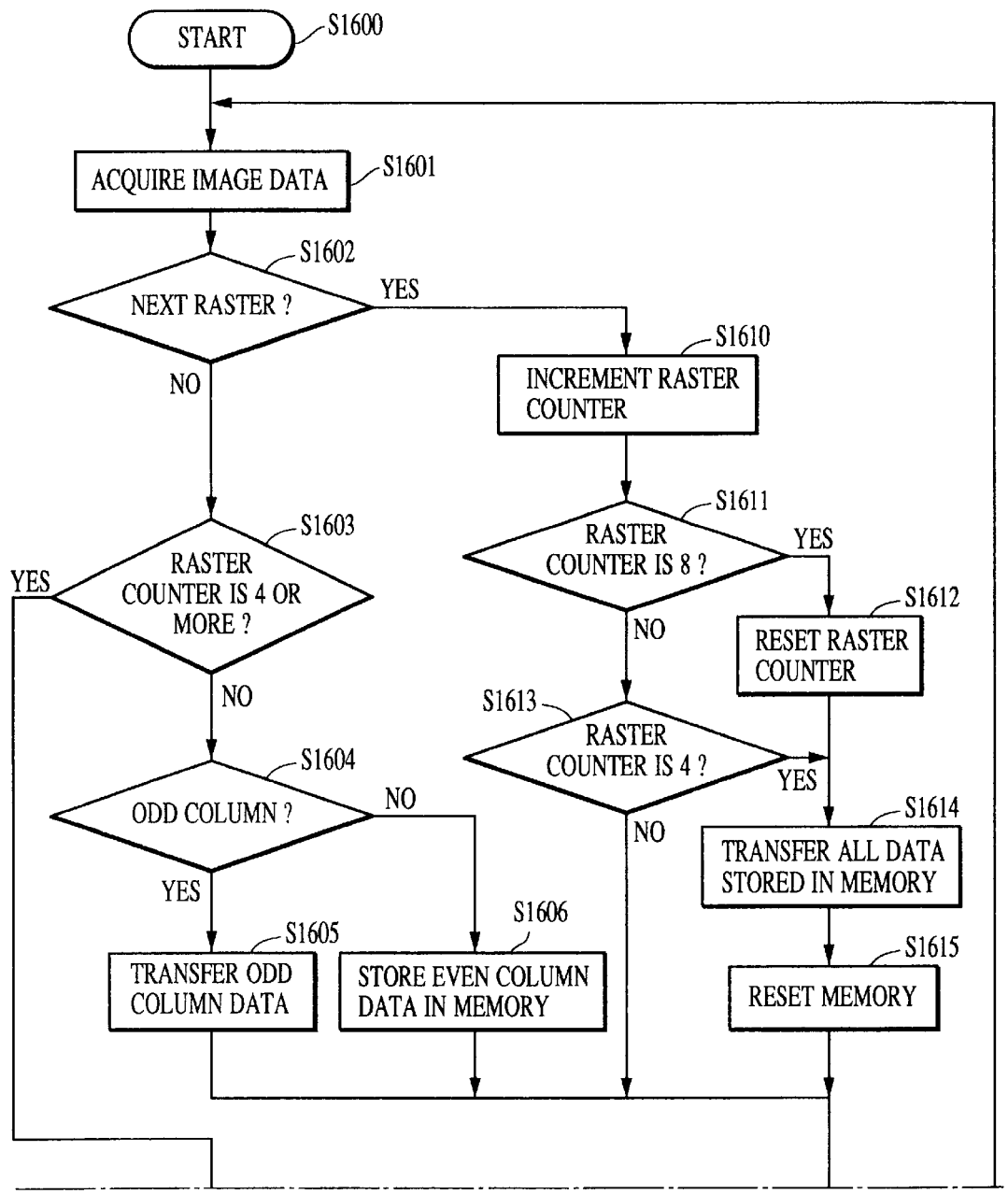
FIG. 16, which is comprised of FIGS. 16A and 16B, is a flowchart showing a processing of the image data transfer side according to an embodiment of the present invention.
Figure 16B:
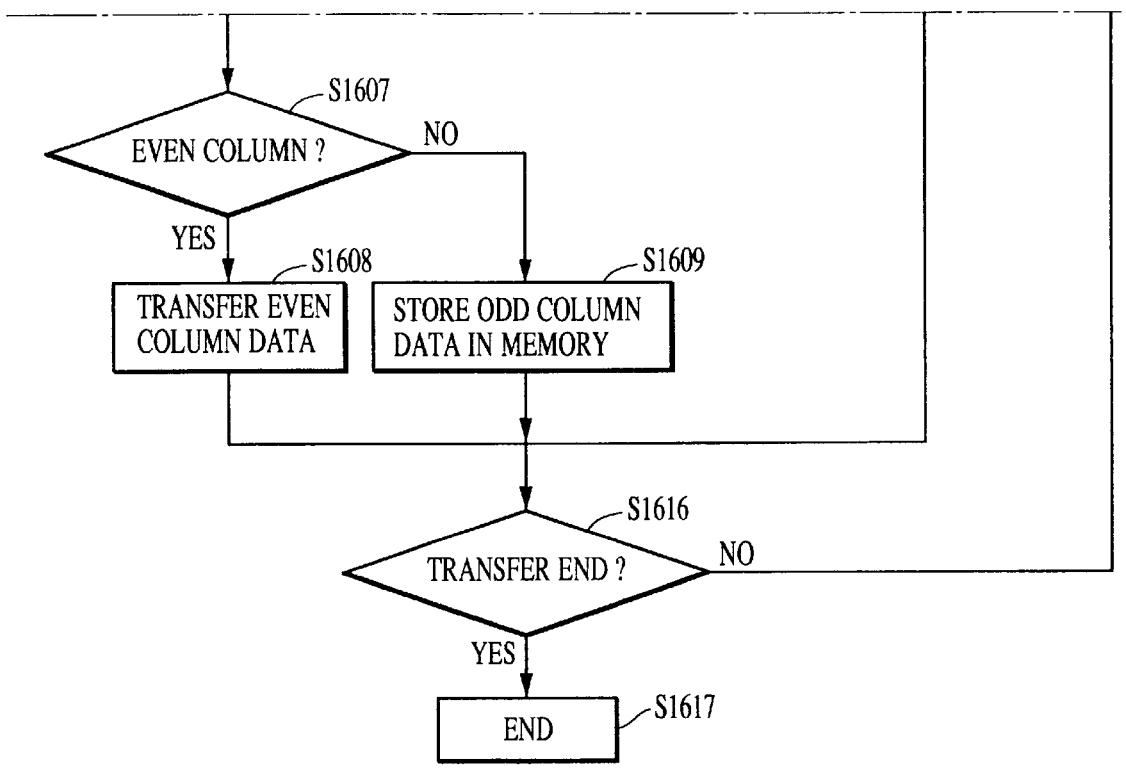

The above processing at the recording image transfer side will now be described with reference to FIG. 16.

Firstly, the recording image data is acquired in step S1601, and whether a new raster is to be started is judged in step S1602. When it is judged in step S1602 that the new raster is not to be started, a procedure advances to step S1603 to judge whether the count value of the raster counter is 4 or more. When the counter value is within 3 in step S1603, whether the picture elements of the recording image data are of odd columns is judged in step S1604. When it is judged in step S1604 that the picture elements of the recording image data are of odd columns, the odd column data is transferred as a picture element data to the recording apparatus in step S1605 and the procedure returns to step S1601.

When it is judged in step S1604 that the picture elements of the recording image are of even columns, the even column data is stored in the memory of the recording image transfer side and the procedure returns to step S1601. It is necessary only that the processing of steps S1604, S1605 and S1606 transfer the odd columns image data as print instruction and stores the even column image data in the memory similar to the first embodiment and the processing does not have to make a judgement for each picture element as described in this embodiment. When the count value of the raster counter is 4 or more in step S1603, the procedure advances to step S1607 to judge whether the picture elements of the recording image data are of even columns. When it is judged in step S1607 that the picture elements of the recording image data are of even columns, the even column data is transferred as picture element data to the recording apparatus in step S1608 and the procedure returns to step S1601. When it is judged in step S1607 that the picture elements of the recording image data are of the odd columns, the odd column data is stored in the memory of the recording image transfer side in step S1609 and then, the procedure returns to S1601.

When it is judged in step S1602 that the new raster is to be started, the procedure advances to step S1610 to increment a raster counter. Then, the procedure advances to step S1611 to judge whether the count value of the raster counter is 8. That is, step S1611 judges whether data transfer has reached two scannings of the recording elements, and the branch condition due to the count value is decided by the number of the picture elements in the direction of the sub-scanning to be recorded at one scanning and the number of the scannings required for completing the image. When it is judged in step S1611 that the count value of the raster counter is 8, the procedure advances to step S1612 to reset the raster counter to zero, and the procedure advances to step S1614. In step S1614, every image data of 4 rasters stored in the memory of the recording image transfer side is transferred to the recording apparatus, and the procedure advances to step S1615 to reset the memory and then, the procedure returns to step S1601.

When it is judged in step S1611 that the count value of the raster counter is not 8, the procedure advances to step S1613 to judge whether the count value of the raster counter is 4. The branch condition is also decided by the number of the picture elements in the direction of the sub-scanning to be recorded at one scanning and the number of the scannings required for completing the image. When the count value of the raster counter is 4 in step S1613, the procedure advances to step S1614. In step S1614, every image data of 4 rasters stored in the memory of the recording image transfer side is transferred to the recording apparatus, and the procedure returns to step S1601.

When the procedures return to step S1601 from steps S1608, S1609, S1605, S1606, S1613 and S1603, respectively, it is judged in step S1601 whether the data transfer is ended. The processing shown in FIGS. 16A and 16B may be performed by stored instruction codes corresponding to the sequence of steps set forth therein as is well known using, for example, the microprocessor arrangement illustrated in aforementioned U.S. Pat. No. 4,567,570.

In this embodiment, the data transfer is controlled in one raster. However, the data may be transferred in 8 rasters.

Figure 1:
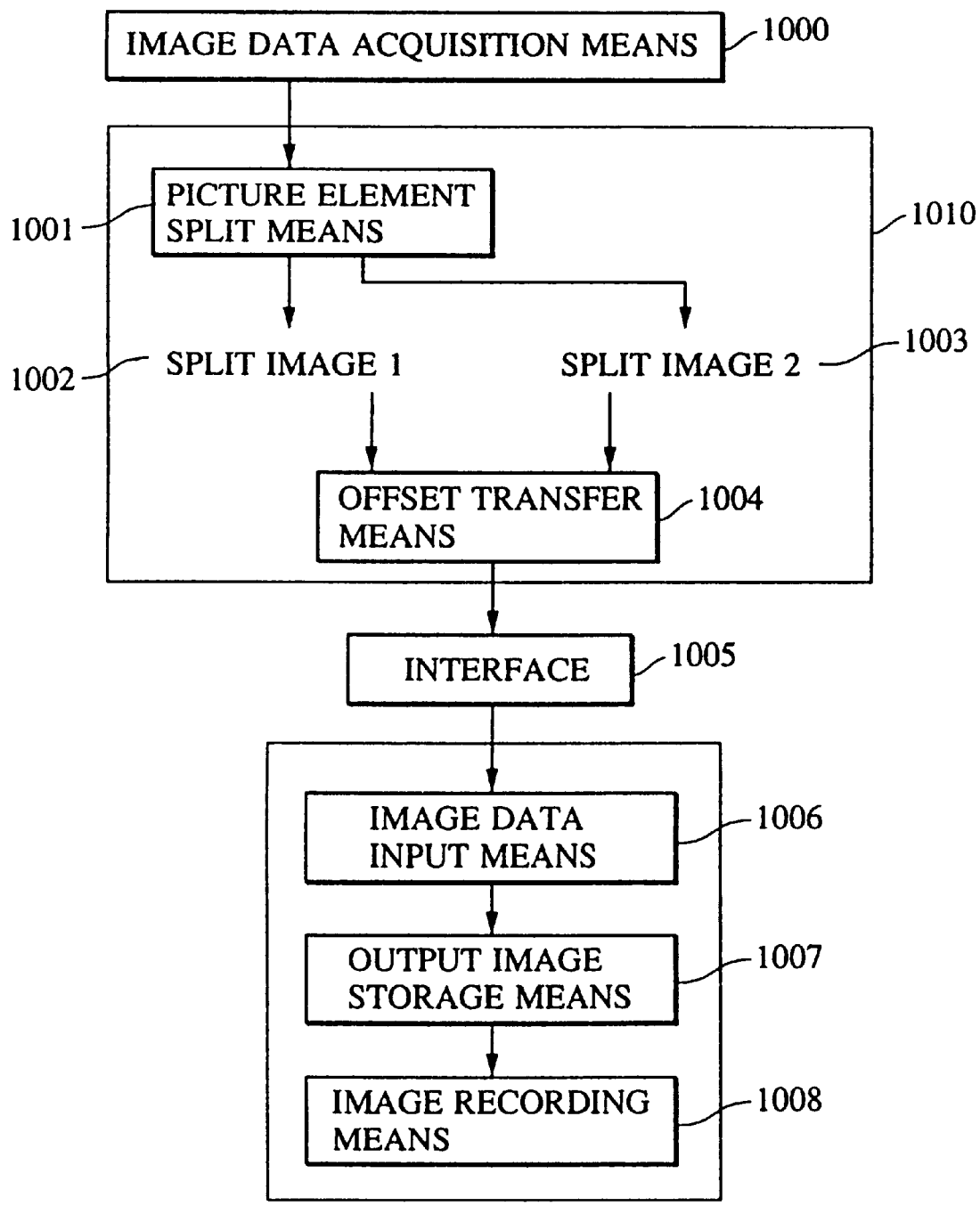
FIG. 1 is a block diagram showing a configuration of an image transfer means according to the present invention.

A case where the image of FIG. 1 is processed with the above processing sequence will now be described with reference to FIGS. 13A to 13D and FIGS. 14A to 14C.

Figure 13A:
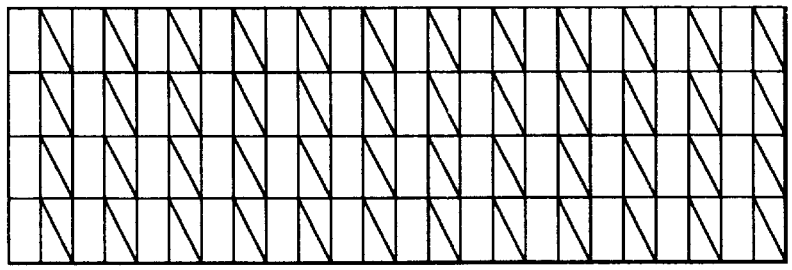
FIGS. 13A to 13D are views each showing image splitting in each of image areas according to an embodiment of the present invention.
Figure 13B:
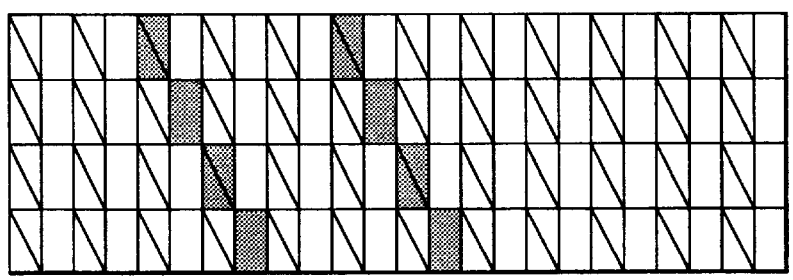
Figures 14A, 14B, 14C:
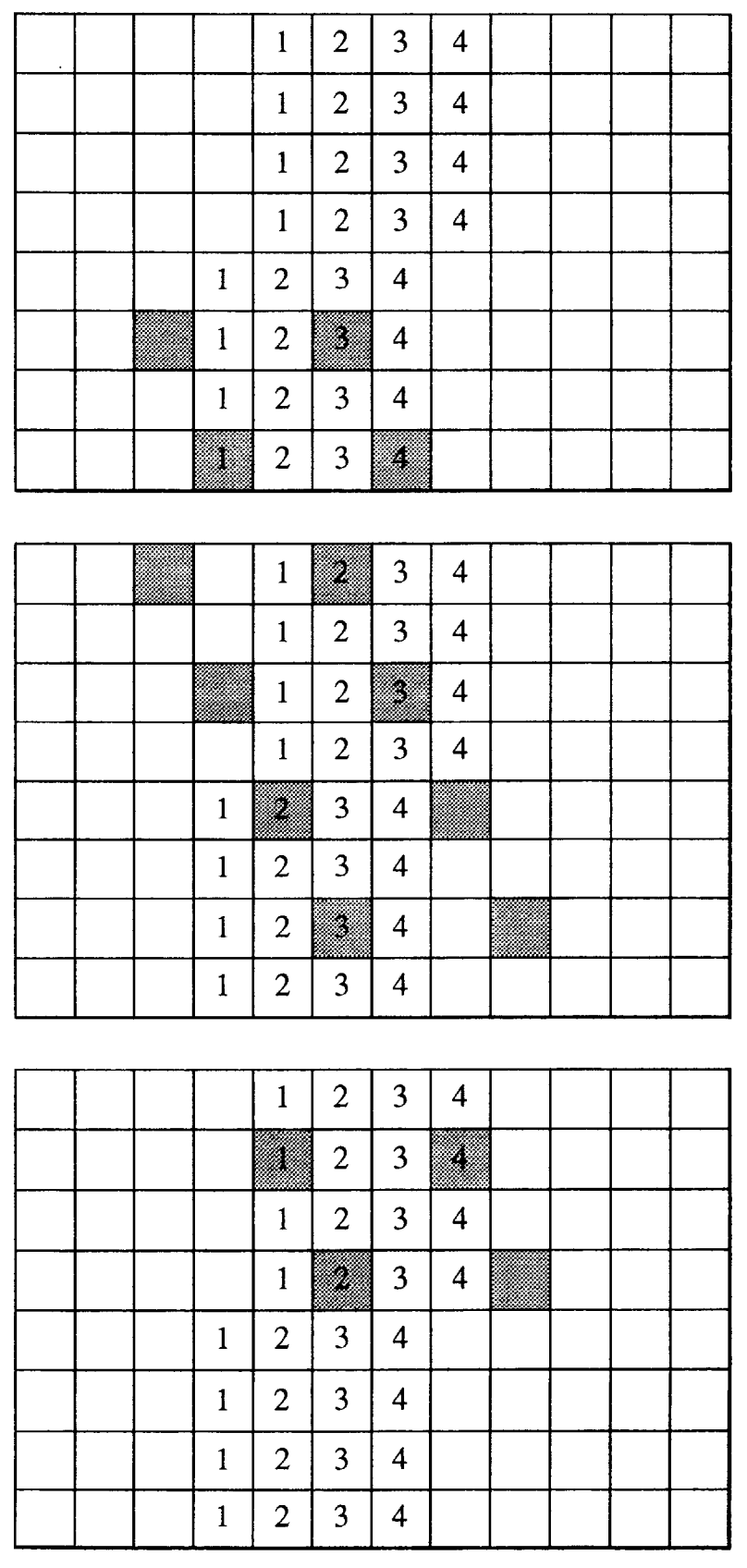

According to the recording operation in this embodiment, the image shown in FIG. 14A is outputted by the output of the image stored in the memory of FIG. 13A and the output when reading the image shown in FIG. 13B. That is, the image of FIG. 14A is outputted by the even column data of FIG. 13A and the even column data of FIG. 13B.

Figure 13C:
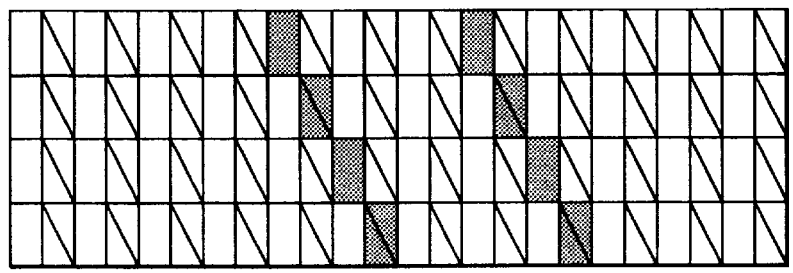

In addition, the image of FIG. 14B is outputted by the output of the image stored in the memory of FIG. 13B and the output when reading the image of FIG. 13C. That is, the image of FIG. 14B is recorded based on the odd column data of the image area of FIG. 13B and the odd column data of the image area of FIG. 13C.

Figure 13D:
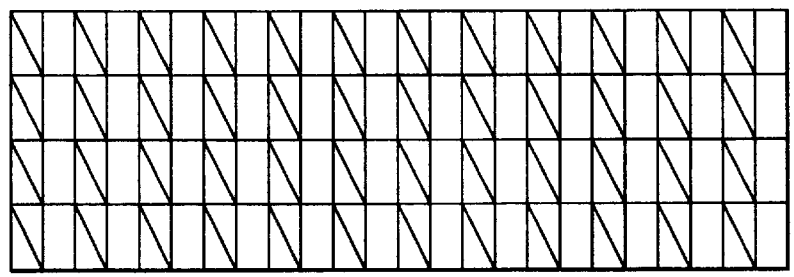

Furthermore, the image of FIG. 14C is outputted by the output of the image stored in the memory of FIG. 13C and the output when reading the image of FIG. 13D. The image of FIG. 14C is recorded based on the even column data of the image area of FIG. 13C and the even column data of the image area of FIG. 13D.

The above-mentioned recording image data shown in FIG. 14A, 14B and 14C are stored respectively in a print buffer in the recording apparatus.

Figure 15A:
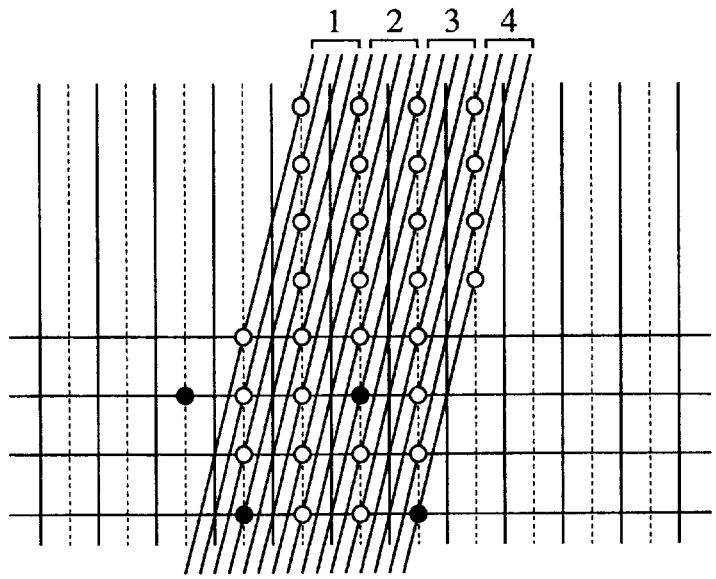
FIGS. 15A to 15C are views each showing a driving timing of the recording elements on a recording medium during each scanning according to an embodiment of the present invention.

The recording by the data of FIGS. 14A to 14C stored in the print buffer will now be described with reference to FIGS. 15A to 15C. FIG. 15A shows timing for recording the data of FIG. 14A stored in the print buffer on a recording medium by the use of the recording elements.

Referring to FIG. 15A, lattice-like solid lines indicate 360 dpi recording positions on the recording medium, dotted lines indicate 720 dpi printing positioned between 360 dpi, sloped lines indicate trains of the recording elements of the recording head, open circles indicate driving timing of the recording elements and black points indicate dots recorded by the scanning of this time, as in the same manner of FIG. 8B.

Figure 15B:
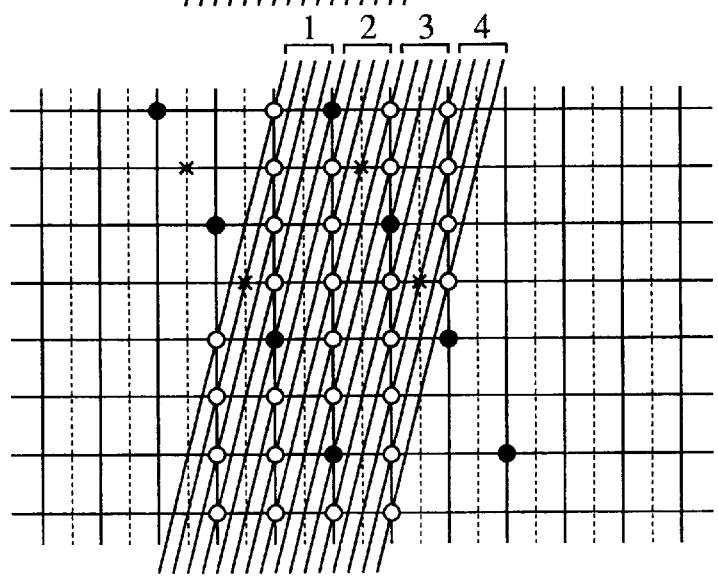

FIG. 15B shows timing for recording the data of FIG. 14B stored in the print buffer on a recording medium by the use of the recording elements. After the completion of the above scanning shown in FIG. 15A, the recording medium is carried only 4 rasters before the scanning of this time. That is, in the preceding scanning and the scanning of this time, 4 rasters of the recording areas overlap on the recording medium. Referring to FIG. 15B, similar to FIG. 15A, lattice-like solid lines indicate 360 dpi recording positions on the recording medium, dotted lines indicate 720 dpi printing positioned between 360 dpi. The sloped solid lines, open circles and black points are similar to those of FIG. 15A. Crosses in FIG. 15B indicate dots recorded by the preceding scanning.

The recording by the scanning shown by the number 1 of FIG. 15B is performed with reference to the data assigned the number 1 among the data of the print buffer shown in FIG. 14B. The recording by the scanning of the numbers 2 to 4 of FIG. 15B are performed by driving the recording elements with reference to the data 2 to 4 of the print buffer of FIG. 14A similar to the recording with scanning of the number 1. The recording by the scanning is performed so that the driving positions of the recording elements are offset 1/720 inch to the right with respect to the preceding recording operation.

Figure 15C:
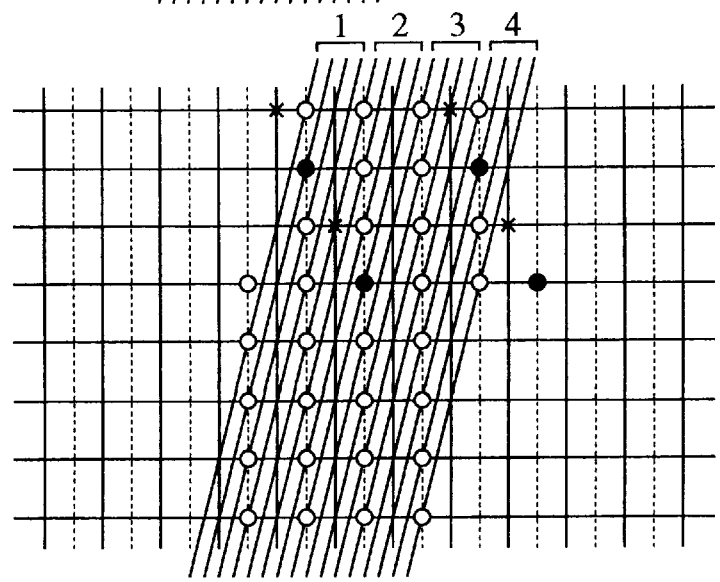

FIG. 15C shows timing for recording the data of FIG. 14C stored in the print buffer on the recording medium by the use of the recording elements. After the completion of the preceding scanning based on the data shown in FIG. 15B, the recording medium is carried only 4 rasters before the scanning of this time. That is, in the preceding scanning and the scanning of this time, 4 rasters of the recording areas overlap on the recording medium.

The lattice-like solid lines, dotted lines, sloped solid lines, open circles and black points are similar to those of FIG. 15A. Similarly, the crosses indicate dots recorded by the preceding scanning. The numbers assigned to the recording in FIG. 15C similarly correspond to the data of the number in the print buffer of FIG. 14C.

The recording by the scanning is performed so that the driving positions of the recording elements are offset 1/720 inch to the left with respect to the preceding recording shown in FIG. 15B, and the recording elements are driven in the timing similar to that of the recording operation shown in FIG. 15A.

Figure 17:
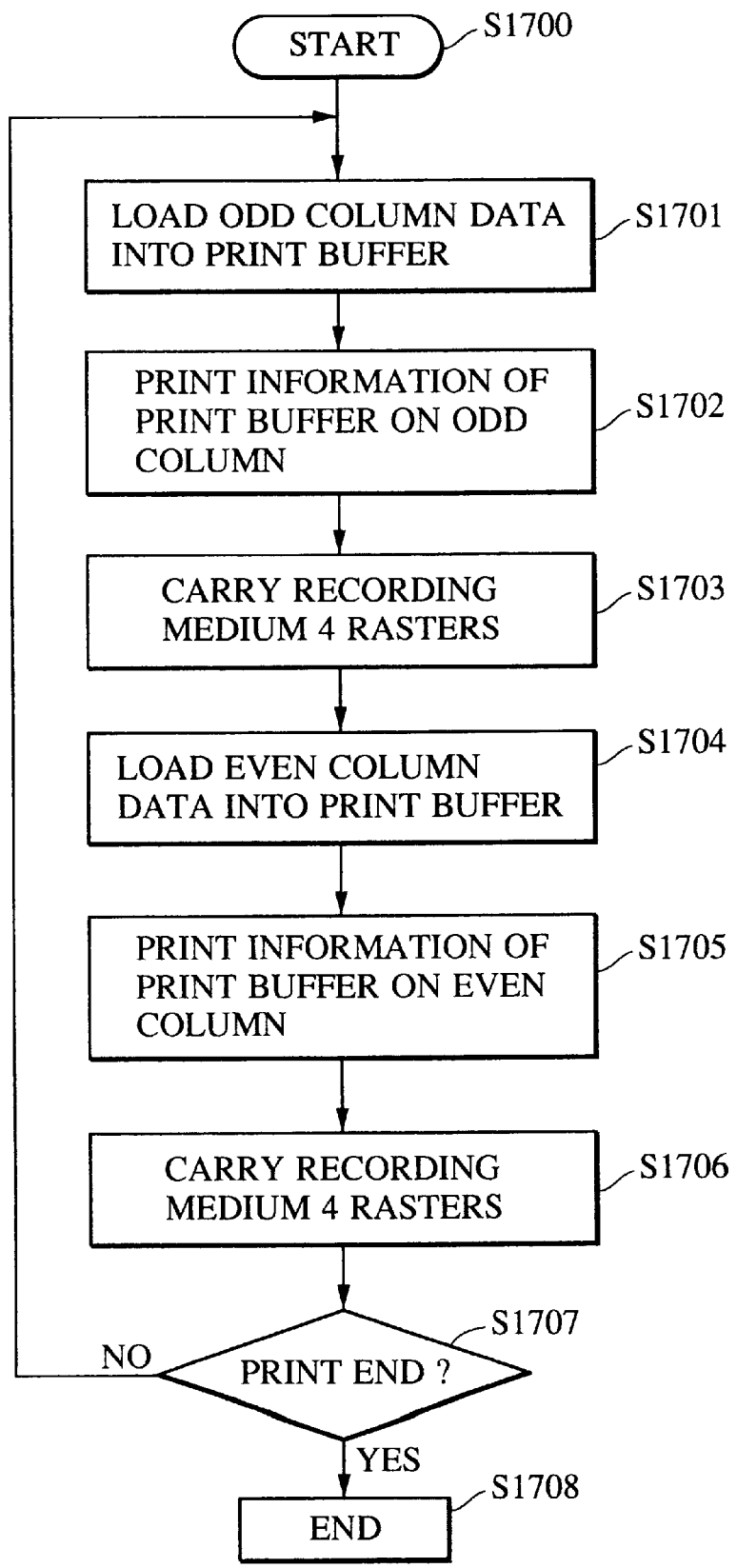
FIG. 17 is a flowchart showing a processing of the main body side of the recording apparatus according to an embodiment of the present invention.

The operation of the recording apparatus during the foregoing processing will be with reference to FIG. 17. The processing shown in FIG. 17 may be performed by stored instruction codes corresponding to the sequence of steps set forth therein as is well known using, for example, the microprocessor arrangement illustrated in aforementioned U.S. Pat. No. 4,567,570.

Firstly, the recording is started in step S1700, and the image data of the odd columns is loaded into the print buffer and stored therein in step S1701. In step S1702, the data stored in the print buffer is recorded on the recording medium at the positions of the odd columns. In step S1703, the recording medium is carried by only 4 rasters, and the image data of the even columns is loaded into the print buffer and stored therein in step S1704. In step S1705, the data of the print buffer is recorded on the recording medium at the positions of the even columns. That is, the recording elements are driven so as to record the data at the positions where the driving timing thereof is offset to the right one picture element in a resolution of 720 dpi with respect to the driving timing of the recording elements in step S1702. In step S1706, the recording medium is carried by only 4 rasters. In step S1707, whether the printing has ended is judged. The procedure returns to step S1701 when the printing has not ended.

The carrying amount of the recording medium will be equal to the amount obtained by the division of the maximum width (subscanning direction) thereof on which the data can be recorded by one scanning by the number of scanning of the recording elements required for completing the image.

By the foregoing operation as described above, 4 rasters of image data can be completed by two-time scanning of the recording elements.

As described above, according to the present invention, by splitting and transferring the picture element data to the image storage means of the main body of the recording apparatus, and forming the images by a plurality of scannings with the use of the split images, high resolution of the recording is possible without increasing the image storage capacity of the main body of the recording apparatus.

In addition, according to this embodiment, by performing the high resolution printing with changing the scanning positions of the recording elements on the recording medium for every scanning, a joint in every scanning becomes unremarkable so that a higher grade resolution of the recording operation is accomplished. Particularly, since the recording operation is attained by a plurality of scannings because of the recording operation performed with a resolution higher than the normal recording resolution, the joint in every scanning is very unremarkable. Thus, by changing the scanning positions of the recording elements in every scanning, it is possible to prevent image deterioration at the joint. Furthermore, variation of each recording element is reduced, thereby attaining image formation of higher quality.

Third Embodiment:

In this embodiment, the recording elements are split into two areas, and the odd columns are printed in the first area, whereas the even columns are printed in the second area.

This embodiment will be described based on an example of recording of FIG. 12 in the same manner as in the second example. In addition, a recording apparatus to be applied to this embodiment is similar to that of the first embodiment, and explanation thereof will be omitted.

In this embodiment, the image of FIG. 12 is split into every 4 rasters to obtain split image areas as shown in FIGS. 18A to 18D, and the same processing is performed therein. In each of the image areas, the picture element data with a sloped line is stored in the memory to output other portions, the images of each of the image area of every 4 rasters are read out and then, the images stored in the memory are outputted.

Figure 21:
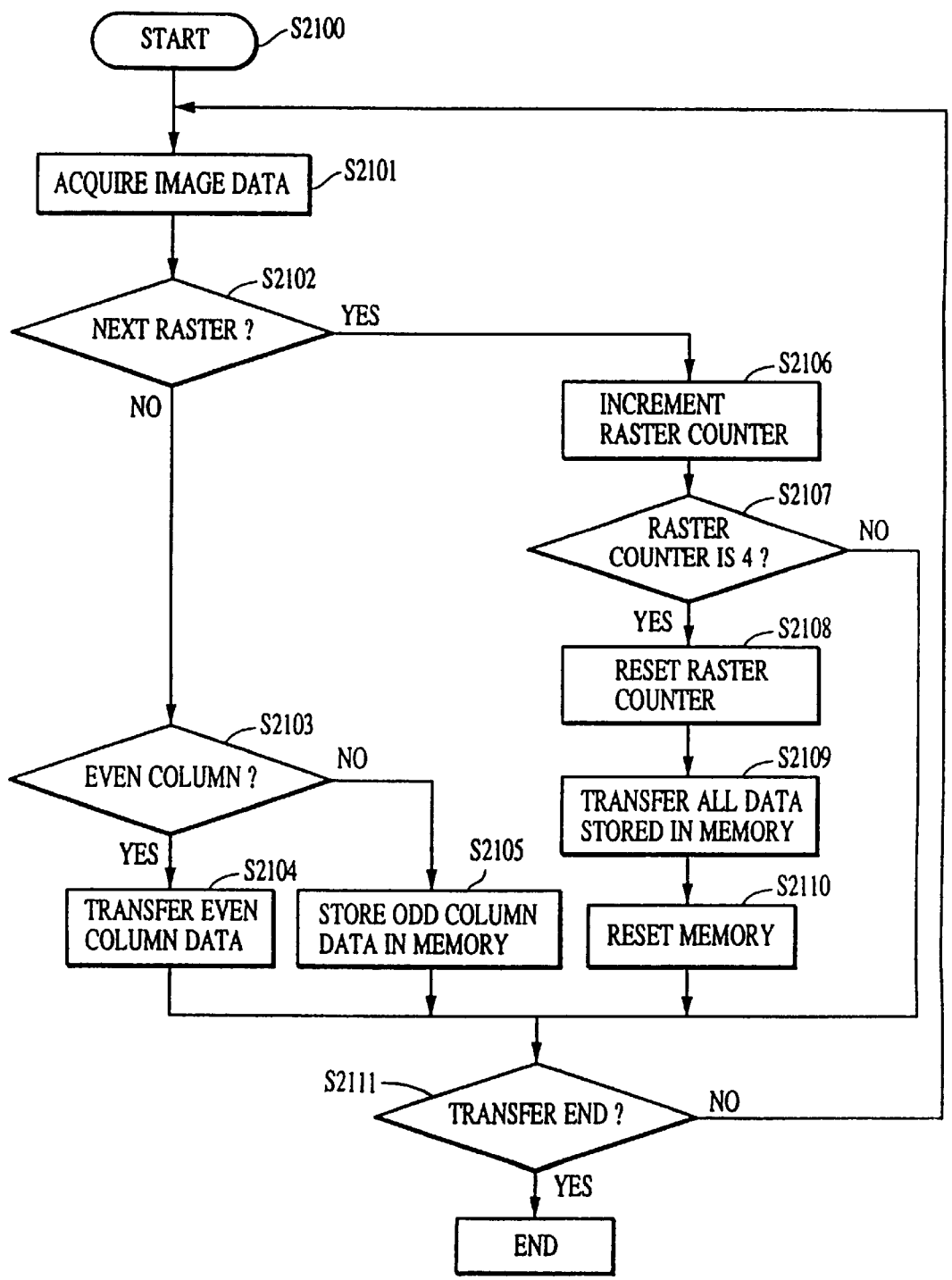
FIG. 21 is a flowchart showing a processing of an image data transfer side according to an embodiment of the present invention.

The above processing at the recording image transfer side will now be described with reference to FIG. 21.

Firstly, the recording image data is acquired in step S2101, and a procedure advances to step S2102 to judge whether a new raster is to be started. When it is judged in step S2102 that the new raster is not to be started, the procedure advances to step S2103 to judge whether the picture elements of the recording image data are of even columns. When it is judged in step S2103 that picture elements of the recording image data are of even columns, the procedure advances to step S2104 to transfer the even column data as the picture element data to the recording apparatus, and then, whether the data transfer has ended is judged in step S2111. When the data transfer is not ended, the procedure returns to step S2101.

When it is judged in step S2103 that picture elements of the recording image data are of odd columns, the procedure advances to step S2105 to store the odd column data in the memory of the recording image transfer side. Whether the data transfer has ended is judged in step S2111 and then, the procedure returns to step S2101.

It is necessary only that the processing of steps S2103, S2104 and S2105 transfers the even columns image data as a print instruction and stores the odd columns image data in the memory. The processing does not have to make judgement for each picture element, as shown in step S2103.

When it is judged in step S2102 that the new raster is to be started, the procedure advances to step S2106 to increment a raster counter. Then, the procedure advances to step S2107 to judge whether the count value of the raster counter is 4. That is, step S2107 judges whether the data transfer of the even columns reaches 4 rasters of the recording elements, and the branch condition due to the count value is decided by the number of the picture elements in the direction of the sub-scanning to be recorded at one scanning and the number of the scannings required for completing the image. When it is judged in step S2107 that the count value of the raster counter is not 4, the procedure returns to step S2107. When it is judged in step S2101 that the count value of the raster counter is 4, the procedure advances to step S2108. In step S2108, the count value of the raster counter is reset to zero and the procedure advances to step S2109. In step S2109, every image data of 4 rasters of odd columns stored in the memory of the recording image transfer side is transferred to the recording apparatus. Then the memory is reset in step S2110, and the end of the transferring is judged in step S2111 and then, the procedure returns to step S2101. The processing shown in FIG. 21 may be performed by stored instruction codes corresponding to the sequence of steps set forth therein as is well known using, for example, the microprocessor arrangement illustrated in aforementioned U.S. Pat. No. 4,567,570.

As described above, a sequence of the data transfer in this embodiment is controlled in one raster. However, it is only necessary for a judgement as to whether the data transfer has reached 4 rasters of the recording medium. Thus, in the case of this embodiment, data may be processed in 8 rasters.

A case where the image of FIG. 12 is processed with the above processing sequence will now be described with reference to FIGS. 18A to 18D and FIGS. 19A to 19C.

Figure 18A:
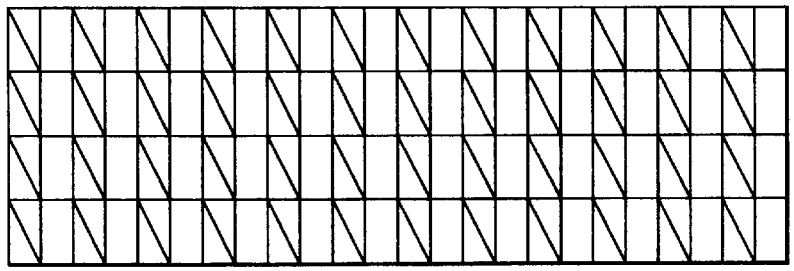
FIGS. 18A to 18D are views each showing a splitting of picture elements in each of image areas according to an embodiment of the present invention.
Figure 18B:
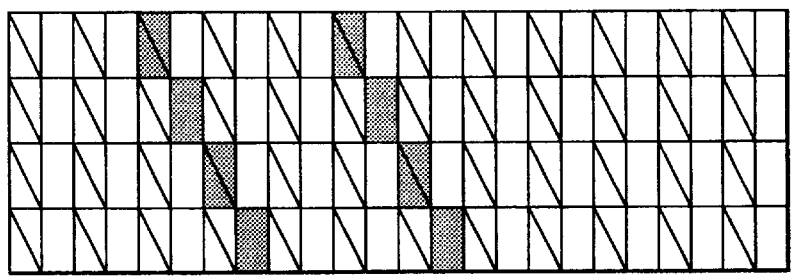
Figure 18C:
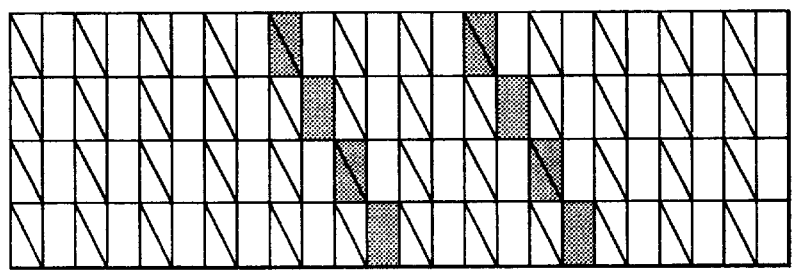
Figure 18D:
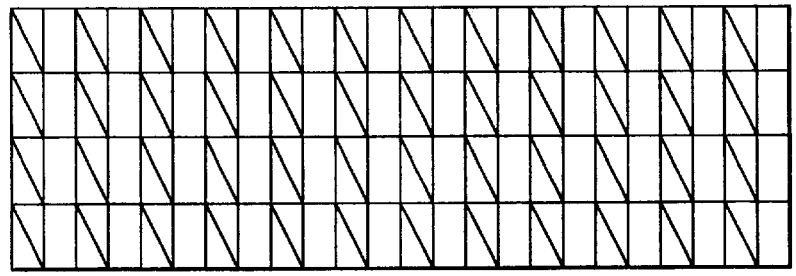
Figures 19A, 19B, 19C:
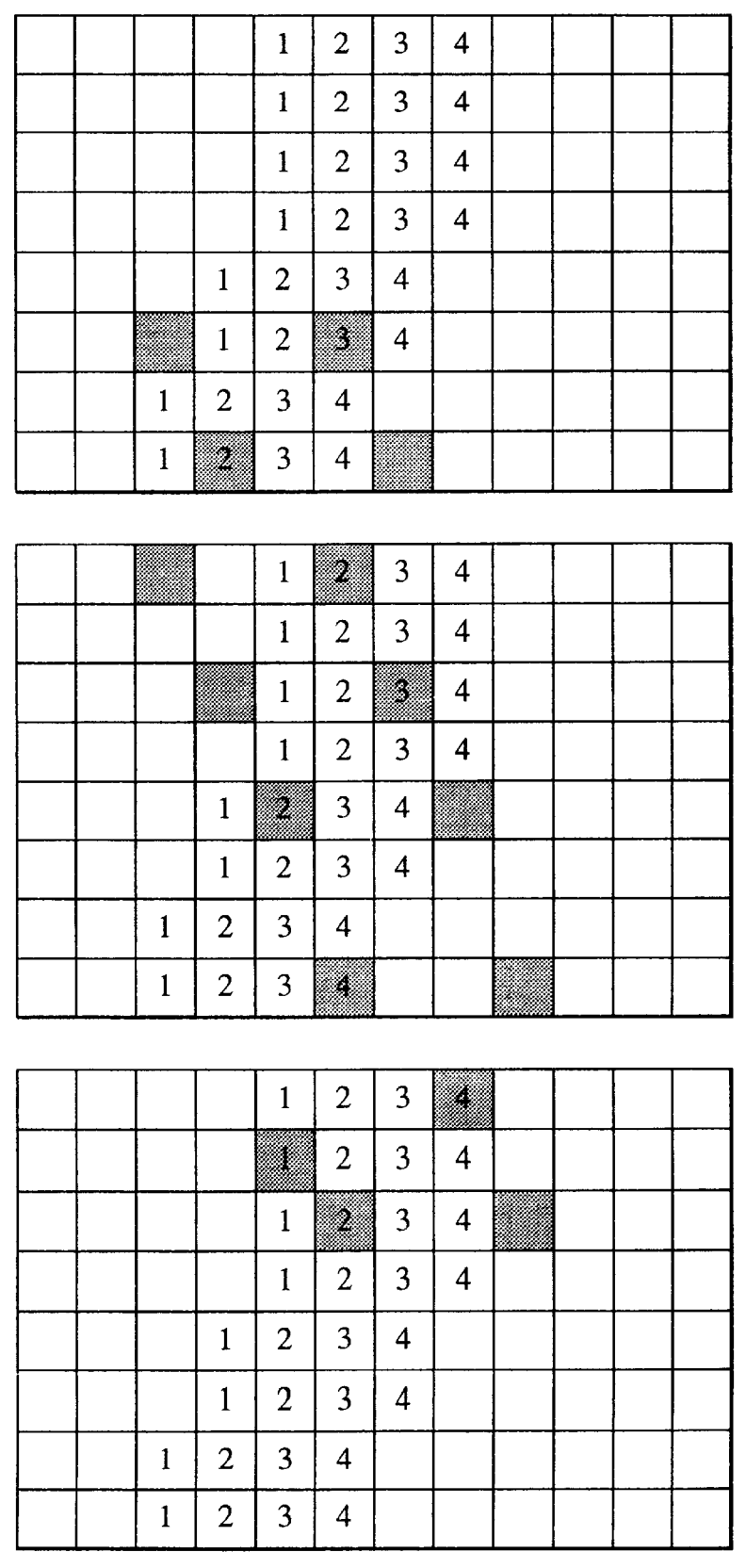

The image data shown in FIG. 19A is outputted by an output of the image of FIG. 18A stored in the memory and an output when reading the image shown in FIG. 18B. In addition, the image data shown in FIG. 19B is outputted by an output of the image of FIG. 18B stored in the memory and an output when reading the image shown in FIG. 18C. Furthermore, the image data shown in FIG. 19C is outputted by an output of the image of FIG. 18C stored in the memory and an output when reading the image shown in FIG. 18D. That is, in the image data shown in FIGS. 19A, 19B and 19C, the upper 4 rasters of the recording areas are odd columns data and the lower 4 rasters of the same are even columns data.

Each image data shown in FIGS. 19A to 19C is stored in a print buffer of the main body of the recording apparatus at the time of recording thereof.

The above data stored in the print buffer will be described with reference to FIG. 20.

Figure 20A:
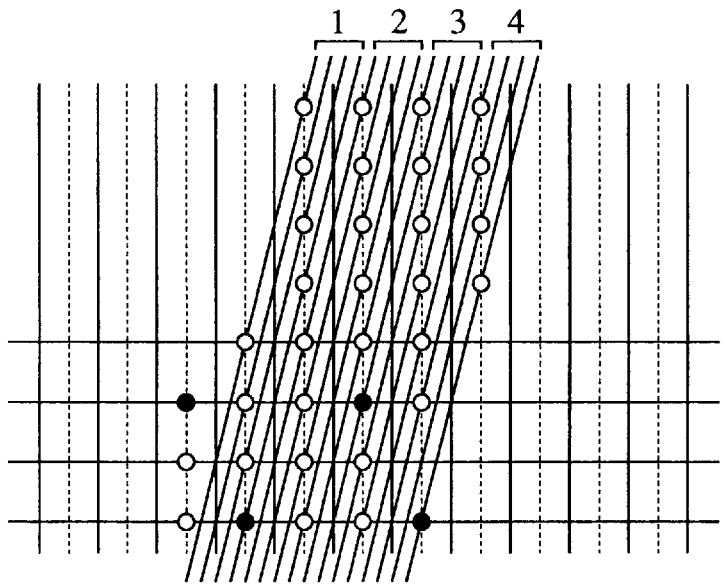
FIGS. 20A to 20C are views each showing a driving timing of the recording elements on the recording medium during each scanning according to an embodiment of the present invention.

FIG. 20A shows timing for recording the data of FIG. 19A stored in the print buffer on a recording medium by the use of the recording elements. The lattice-like solid lines, dotted lines, sloped lines, open circles, black points and crosses are similar to those of the above-mentioned embodiments.

Figure 20B:
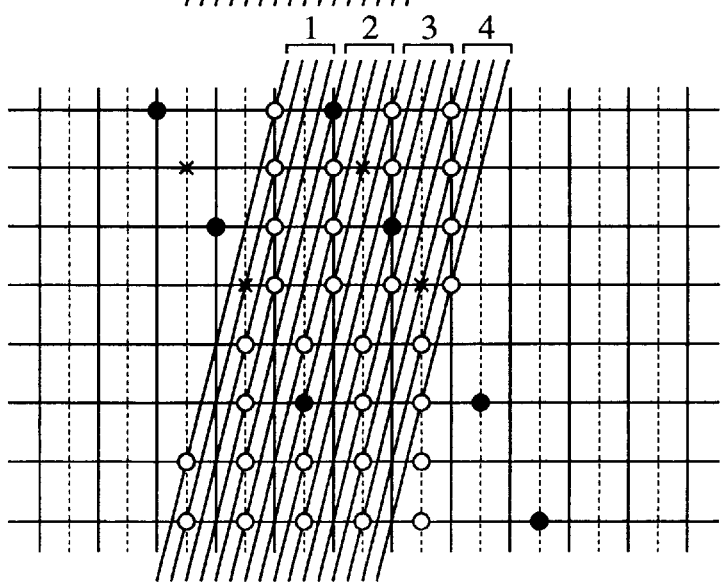
Figure 20C:
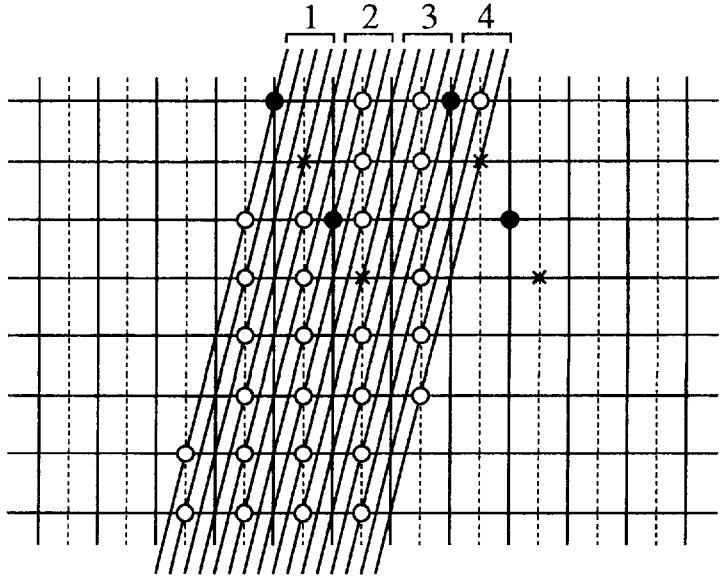

FIG. 20B shows timing for recording the data of FIG. 19B stored in the print buffer on the recording medium by the use of the recording elements. Between the completion of the scanning of FIG. 20A and the scanning of this time, the recording medium is carried by only 4 rasters. That is, in the preceding scanning and the scanning of this time, 4 rasters of the recording areas overlap on the recording medium. The recording by the scanning shown by the number 1 of FIG. 20B is performed with reference to the data assigned the number 1 of the print buffer. Similarly, the scanning of the numbers 2 to 4 of FIG. 20B are recorded by driving the recording elements with reference to the numbered data of the print buffer of FIG. 19B FIG. 20C shows timing for recording the data of FIG. 19C stored in the print buffer on the recording medium by the use of the recording elements. Between the completion of the scanning of FIG. 20B and the scanning of this time, the recording medium is carried by only 4 rasters. In the preceding scanning and the scanning of this time, 4 rasters of the recording areas also overlap on the recording medium.

Figure 22:
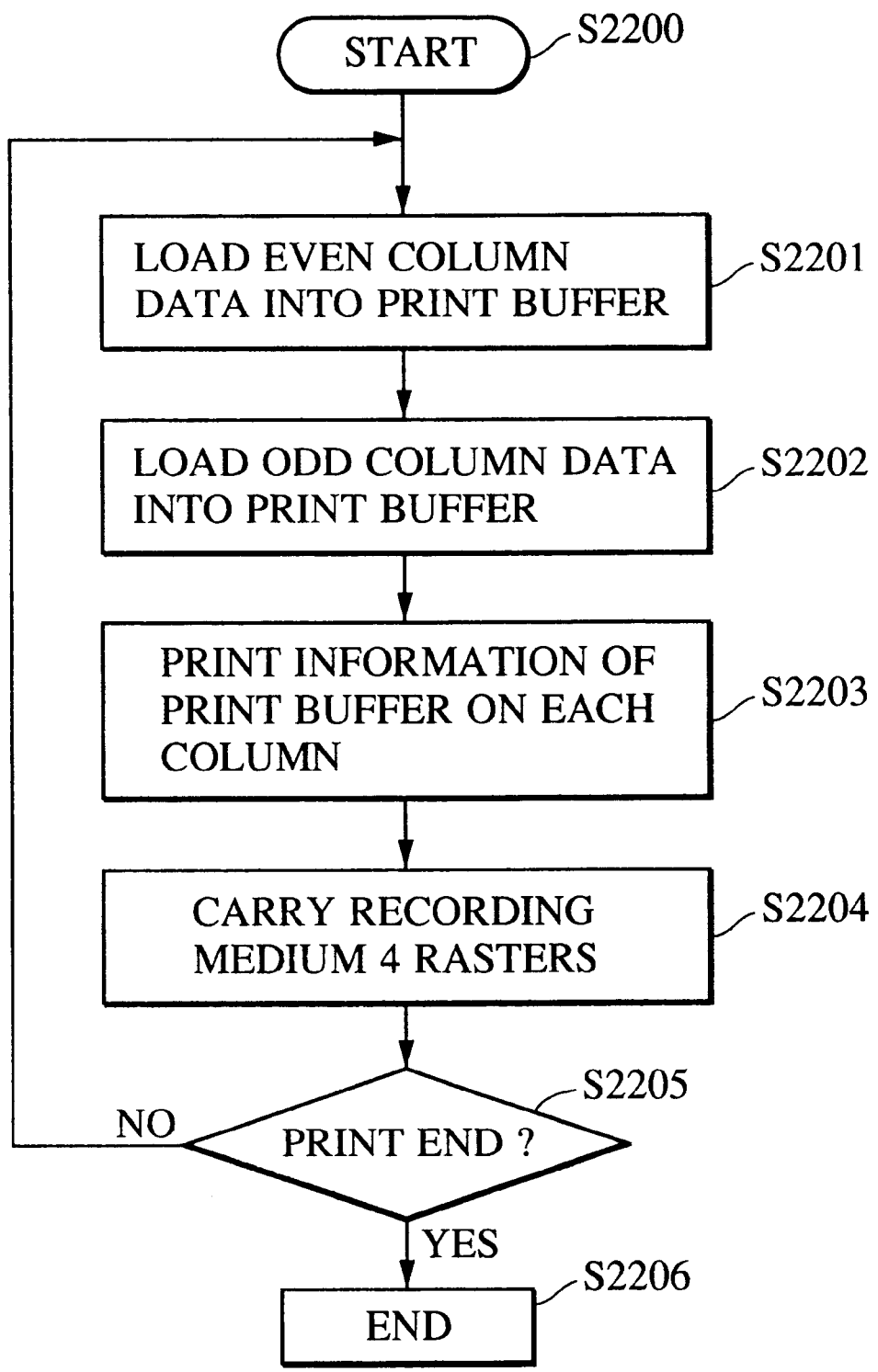
FIG. 22 is a flowchart showing a processing of the main body side of the recording apparatus according to an embodiment of the present invention.

The operation of the recording apparatus during the foregoing processing will be described with reference to FIG. 22. The processing shown in FIG. 22 may be performed by stored instruction codes corresponding to the sequence of steps set forth therein as is well known using, for example, the microprocessor arrangement illustrated in aforementioned U.S. Pat. No. 4,567,570.

Firstly, a procedure is started in step S2200, and the image data of odd columns is loaded into the print buffer and stored therein in step S2201. Then, the image data of even columns is loaded into the print buffer and stored therein in step S2202. In step S2203, the recording operation is performed based on the data of the print buffer. In step S2204, a recording medium is carried by only 4 rasters. The carrying amount of the recording medium in step S2204 will be equal to the amount obtained by the division of the maximum width (sub-scanning direction) thereof on which the data can be recorded by one scanning by the number of scannings of the recording elements required for completing the image.

By the operation as described above, 4 rasters of image data can be completed by two-scanning of the recording elements.

In addition, similar to splitting of the recording elements, the print buffer may be split. By loading the odd columns data into the first area and loading the even columns data into the second area to drive the recording elements with the data obtained by masking the print buffer data, it is possible to employ a multi-pass printing method for completing the recording image by a plurality of scanning, which is disclosed in Japanese Laid-Open Patent Application No. 107975/1985.

In this embodiment, the recording image is completed by two-scanning of 4-raster carrying. However, the recording image may be completed by 4-scanning while carrying the recording medium every 2 rasters. A method of image loading and masking of the print buffer during the above recording will be described with reference FIGS. 23A to 23H.

Figure 23A:
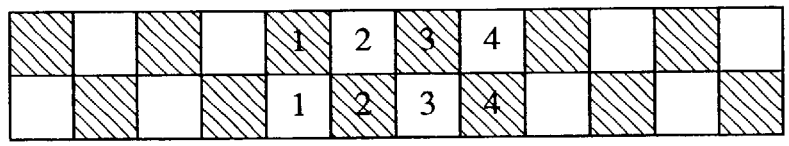
FIGS. 23A to 23H are views each showing masking when an image is loaded into a print buffer according to the present invention.
Figure 23B:
Figure 23C:
Figure 23D:
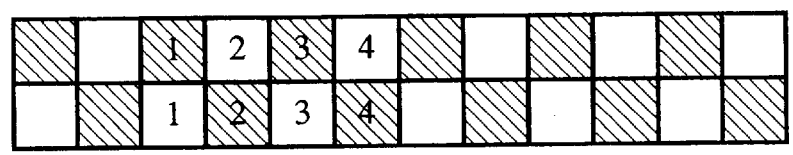

FIGS. 23A, 23B, 23C and 23D show a print buffer of one scanning in total. FIGS. 23A and 23B show a print buffer of the first area of the recording elements, and FIGS. 23C and 23D show a print buffer of the second area. The diagonally shaded portions show areas to be masked, and the picture element data thereof is data which does not drive the recording elements.

Figure 23E:
Figure 23F:
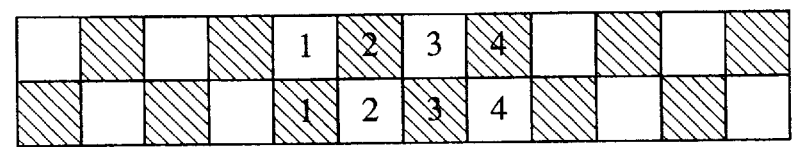

FIGS. 23E, 23F, 23G and 23H show a print buffer of one scanning in total. FIGS. 23E and 23F show a print buffer of the first area of the recording elements, and load 2 rasters of data of the first area thereinto without using the data of FIG. 23A. That is, the data of FIG. 23E is the same data as that of FIG. 23B, and the data of FIG. 23F is newly loaded data.

Figure 23G:
Figure 23H:

Similarly, FIGS. 23G and 23H show a print buffer of the second area of the recording elements. The data of FIG. 23G is the same data as that of the FIG. 23D, and the data of FIG. 23H is newly loaded data.

In addition, the diagonally shaded portions represent data to be masked by which the preceding maskings are complemented.

As described above, by loading the data of each of the areas into the print buffer and carrying the recording medium by one-half of the width of the split image areas in the column direction among each of the scannings of the recording elements, it is possible to employ a multi-pass printing method using a mask.

When the print buffer is split by the usage areas of the recording elements, the data of each of the usage areas may be preferably transferred for every one raster.

As described above, according to the present invention, by splitting and transferring the picture element data to the image storage means of the main body of the recording apparatus, and forming the images by a plurality of record scanning with the use of the split images, the high resolution of the recording is possible without increasing the image storage capacity of the main body of the recording apparatus. In addition, by performing the high resolution of printing with changing the scanning positions of the recording elements on the recording medium for every scanning, a joint in every scanning becomes unremarkable so that a higher grade resolution of the recording is attained. Furthermore, variation of each recording element can be reduced, thereby attaining image formation of higher quality.

Furthermore, in this embodiment, the train of the recording elements is split into two areas to print the odd columns data in the first area and the even columns data in the second area. Therefore, the high resolution of the complementary recording can be attained without changing the mask for every scanning.

Fourth Embodiment:

A fourth embodiment of the present invention will now be described.

In the foregoing embodiments, a resolution of the recording image is increased to twice that of the standard recording, and the picture element data of the image is divided into two parts in the picture elements. However, in a recording method similar to the first embodiment, the number of splitting image element data is increased for each increase in the resolution so that a higher resolution of the recording operation is possible.

In this embodiment, the picture elements are split by every (multiple of n+k)th column, in which k is an integer between 0 to n−1.

An offset transfer means in this embodiment transfers sequentially the image data split for every column for data of the recording width of the raster direction in one scanning to the main body of the recording apparatus.

The driving timing of the recording elements of the main body of the recording apparatus is recorded by offsetting k/n of the standard drive cycle with respect to a standard recording timing for each scanning.

Figure 2:
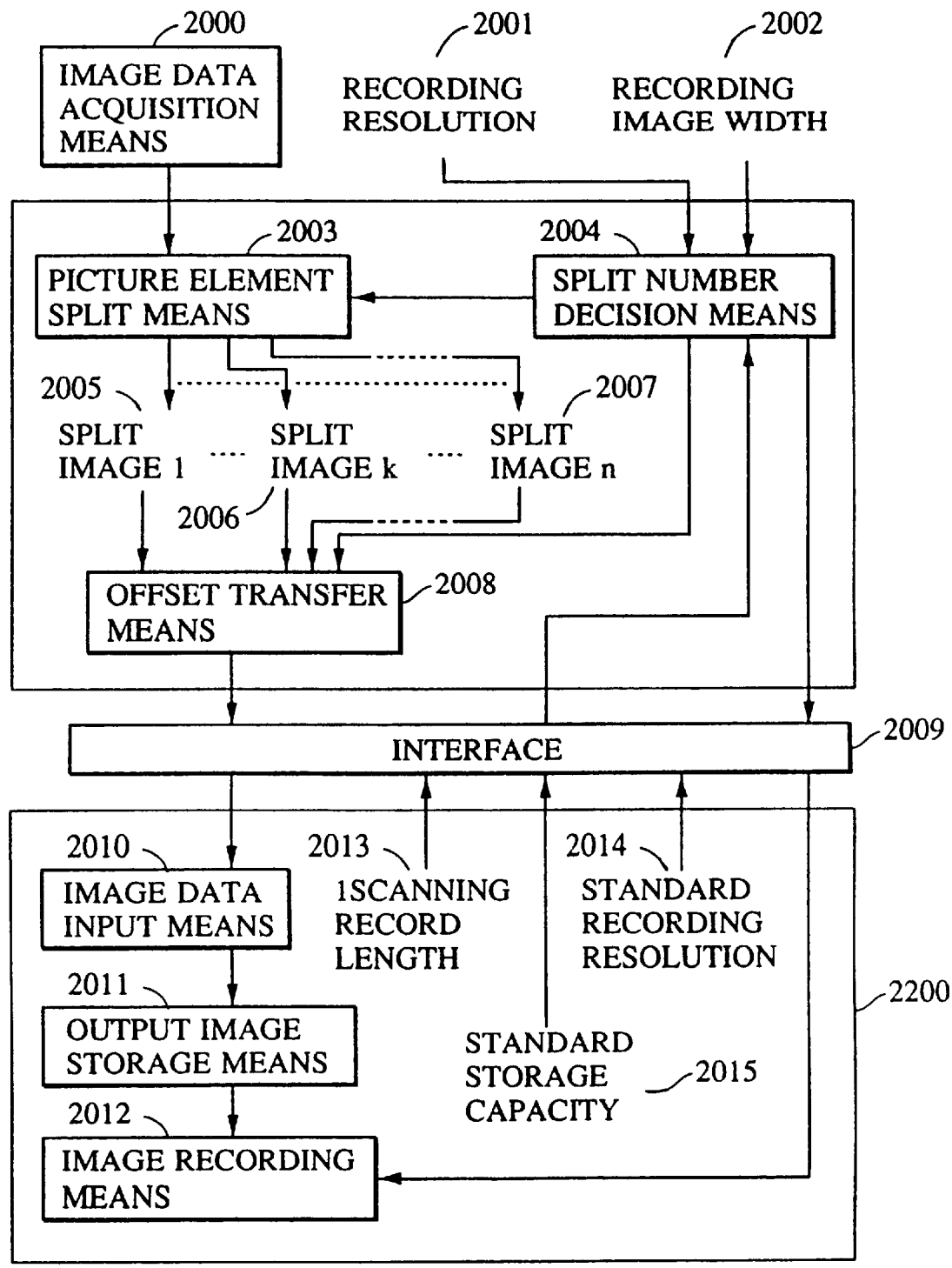
FIG. 2 is a block diagram showing a configuration of an image transfer means using a bidirectional interface shown in an embodiment according to the present invention.

A method of deciding the split number of the picture elements in a recording method of this embodiment with the conditions of the main body of the recording apparatus will be described with reference to FIG. 2.

In this embodiment, a bidirectional interface 2009 allows the recording image transfer side to obtain information from the structure of the main body of the recording apparatus. The split number of the picture elements is a value obtained by dividing a resolution 2001 in the lateral direction (direction of main scanning) of the recording image by a standard recording resolution 2014 which is a resolution by which the main body of the recording apparatus can record in one scanning. This calculation is performed by a split number decision means 2004 to decide the split number n by the picture element-splitting means 2003. Since the split number of the picture elements is a positive integer, the resolution of the image data is inevitably restricted to multiples of the standard recording resolution of the recording apparatus. A one scanning record vertical length 2013 which is the vertical length of the recording image by one scanning of the recording elements in the main body of the recording apparatus is acquired by the split number decision means 2004, and the maximum raster number which can be recorded by one scanning of the main body of the recording apparatus is sent to the offset transfer means 2008. The offset transfer means 2008 sequentially transfers the split images 1 to n (2005 to 2007) which are split into n groups by the picture element split means 2003 for every number corresponding to the maximum raster number. An image recording means 2012 acquires the split number n of the picture elements by the split number decision means 2004. The driving timing of the recording elements of the main body of the recording apparatus is recorded by offsetting k/n of the standard drive cycle with respect to the standard recording timing for each scanning, and the next scanning offset (n−1)/n of the standard drive cycle is returned to the standard scanning.

With the above-mentioned means, the image data having a resolution of n times the resolution of the recording apparatus in the scanning direction can be recorded.

The amount of offset of the driving timing of the recording elements in the image recording means 2012 from the standard timing is decided by the number k of splitting the picture elements and the split image k stored in the print buffer 2011, and set to k/n of the standard drive cycle. To select the split image to be used for deciding the offset amount, information about the split image which can be recognized by the main body of the recording apparatus may be added to a certain split image and transfer the split image.

As described above, according to the present invention, by splitting the picture element data into n parts (n is an integer of two or more) and transferring the same to the image storage means of the main body of the recording apparatus, and forming the images using the picture element data split for every multiple of (n+k)th column (k is an integer between 0 and n−1) and with shifting the recording timing every k/n of the standard drive cycle by a plurality of record scannings, the high resolution of the recording is possible without increasing the image storage capacity of the main body of the recording apparatus. Structures for splitting, transmission and timing of transmission of picture data for printing are well known as exemplified by the aforementioned Japanese Patent Documents JP 5183913, JP 5145678 and JP 5037850. The arrangements in FIG. 2 for transmission of information on maximum recording resolution, picture element data splitting numbers and grouping of picture elements may be performed in a microprocessor structure such as shown in aforementioned U.S. Pat. No. 4,567,570.

Fifth Embodiment:

Control in each of the above described embodiments may be performed at a host side which is connected to a printer and performs data transfer and recording control. As the printer to be connected may be a recording apparatus which forms dots on the recording medium by driving the recording elements and using a recording head having a plurality of recording heads disposed therein based on recording data held by a recording data holding means, and which can control the recording position in the main scanning direction and control the line feed after on scanning from the host side. At the host side, an image splitting is effected and the recording apparatus is controlled so as to record the split images at the desired positions, thereby attaining the high resolution of recording.

Sixth Embodiment:

In each of the embodiments as described above, the high resolution of the recording operation can be attained by transferring the offset recording data and forming images by a plurality of scannings. The foregoing plurality of scannings may be either a plurality of scanning in the fixed direction or reciprocating scanning.

Other Embodiments:

The present invention is particularly suitably usable in a bubble jet recording head and recording apparatus developed by Canon Kabushiki Kaisha, Japan. This is because, the high density of the picture elements, and the high resolution of the recording are possible.

The typical structure and the operational principle of preferably the one disclosed in U.S. Pat. Nos. 4,723,129 and 4,740,796. The principle is applicable to a so-called on-demand type recording system and a continuous type recording system particularly however, it is suitable for the on-demand type because the principle is such that at least one driving signal is applied to an electrothermal transducer disclosed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the development and collapse of the bubble, the liquid (ink) is ejected through an ejection outlet to produce at least one droplet. The driving signal is preferably in the form of a pulse, because the development and collapse of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Laid-Open Patent Application Publication No. 123670/1984 wherein a common slit is used as the ejection outlet for plural electrothermal transducers, and to the structure disclosed in Japanese Laid-Open Patent Application No. 138461/1984 wherein an opening for absorbing a pressure wave of the thermal energy is formed corresponding to the ejecting portion. This is because, the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head or plural recording heads combined to cover the entire width.

In addition, the present invention is applicable to a serial type recording head wherein the recording head is fixed on the main assembly, or a replaceable chip type recording head which is connected electrically with the main apparatus and can be supplied with the ink by being mounted in the main assembly, or to a cartridge type recording head having an integral ink container.

The provision of the recovery means and the auxiliary means for the preliminary operation are preferable, because they can further stabilize the effect of the present invention. As for such means, there are capping means for the recording head, cleaning means therefor, pressurizing and suction means, preliminary heating means by the ejection electrothermal transducer or by a combination of the ejection electrothermal transducer and additional heating elements and means for preliminary ejection not for the recording operation, which can stabilize the recording operation.

As regards the kinds of mountable recording heads, it may be a single corresponding to a single color ink, or may be plural corresponding to the plurality of ink materials having different recording color or density. The present invention is effectively applicable to an apparatus having at least one of a monochromatic mode mainly with black and a multi-color with different color ink materials and a full-color mode by the mixture of the colors which may be an integrally formed recording unit or a combination of plural recording heads.

Furthermore, in the foregoing embodiment, the ink has been liquid. It may be, however, an ink material solidified at the room temperature or below and liquefied at the room temperature. Since in the ink jet recording system, the ink is controlled within the temperature not less than 30° C. and not more than 70° C. to stabilize the viscosity of the ink to provide the stabilized ejection, in a usual recording apparatus of this type, the ink is such that it is liquid within the temperature range when the recording signal is applied. In addition, the temperature rise due to the thermal energy is positively prevented by consuming it for the state change of the ink from the solid state to the liquid state, or the ink material is solidified when it is left unused to prevent the evaporation of the ink. In either of the cases, the application of the recording signal producing thermal energy, the ink may be liquefied, and the liquefied ink may be ejected. The ink may start to be solidified at the time when it reaches the recording material. The present invention is applicable to such an ink material as is liquefied by the application of the thermal energy. Such an ink material may be retained as a liquid or solid material on through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as a computer or the like, a copying apparatus combined with an image reader or the like, or a facsimile machine having information sending and receiving functions. While the invention has been described with reference to the structures disclosed herein, it is not confined to the details set forth and this application is intended to cover such modifications or changes as may come within the purpose of the improvements or the scope of the following claims.

As described above, according to the present invention, by splitting and transferring the picture element data to the image storage means of the main body of the recording apparatus, and forming the images by a plurality of record scannings with the use of the split images, the high resolution of the recording is possible without increasing the image storage capacity of the main body of the recording apparatus.

The term "offset" as used in the above description of the present invention means an operation for controlling dots to be recorded and the positions thereof such that the recording can be effected at the resolution higher than a predetermined one by recording split images at the predetermined resolution and by complementing between the split images.

What is claimed is:

1. A recording system usable with a recording apparatus having a recording head on which a plurality of recording elements are arranged in a direction of sub-scanning, and scanning means for scanning the recording head in a main scanning direction substantially orthogonal to the direction of sub-scanning, said recording system comprising:

picture-element data splitting means for splitting picture-element data of image data into sets of split picture-element data, wherein each set of the sets of split picture-element data corresponds to the image data which is split by a predetermined number of picture-element data;

split transfer means for transferring the sets of image data split by said picture-element data splitting means;

storage means coupled to the recording apparatus for storing one set of the sets of split picture-element data transferred by said split transfer means; and recording means coupled to the recording apparatus for recording the one set of split picture-element data stored in said storage means on a recording medium while the recording head is scanned once in the main scanning direction, wherein said recording means records an image corresponding to the image data by a plurality of scans using the sets of split picture-element data.

2. A recording system according to claim 1, wherein said recording means shifts a driving timing of the recording elements in the main scanning direction when recording a set of split picture-element data for odd numbered column picture elements and when recording a set of split picture-element data for even numbered column picture-elements.

3. A recording system according to claim 1, wherein said split offset transfer means alternately performs a first transfer for transferring a set of odd numbered column picture-element data of one-half of the main scanning and a second transfer for transferring a set of even numbered column picture-element data of one-half of the main scanning.

4. A recording system according to claim 3, wherein said recording means shifts a driving timing of the recording elements in a direction of the main scanning when recording the set of odd numbered column picture-element data and when recording the set of even numbered column picture-element data.

5. A recording system according to claim 3, wherein said recording means carries a recording medium during each record scanning in the direction of sub-scanning by one-half of the record scanning.

6. A recording system according to claim 3, wherein said storage means stores a set of split picture-element data transferred by said split transfer means to store the set of odd numbered column picture-element data separately from the set of even numbered column picture-element data.

7. A recording system according to claim 6, wherein a first group of recording elements corresponds to one of the sets of split picture-element data, and a second group of recording elements corresponds to the other of the sets of split picture-element data in said storage means.

8. A recording system according to claim 6, wherein the first transfer for transferring the set of odd numbered column split picture-element data of one scanning and a second transfer for transferring the set of even numbered column split picture-element data of one scanning by said split transfer means shifts recording of an image in the direction of sub-scanning by one-half of one scanning.

9. A recording system according to claim 6, wherein said recording means records split picture-element data stored in said storage means to complete an image with a plurality of record scannings.

10. A recording system according to claim 1, wherein said recording means splits a plurality of recording elements into a first group of recording elements for recording odd numbered columns and a second group of recording elements for recording even numbered columns.

11. A recording system according to claim 10, wherein the recording medium is moved after each record scanning in the direction of the sub-scanning by one half of a width of the recording scanning.

12. A recording system according to claim 1, wherein said picture-element data splitting means splits picture-elements in the direction of main scanning into a set of odd numbered column picture-elements and a set of even numbered column picture-elements.

13. A recording system according to claim 12, wherein said split offset transfer means alternately performs a first transfer for transferring the set of odd numbered column picture-elements of one scanning and a second transfer for transferring the set of even numbered column picture-elements of one scanning.

14. A recording system according to claim 12, wherein a first transfer for transferring the set of odd numbered column picture-elements of one scanning and a second transfer for transferring the set of even numbered column picture-elements of one scanning by said split offset transfer means offsets recording an image in the direction of the sub-scanning by one-half of one scanning.

15. A recording system according to claim 12, wherein said split transfer means alternately performs a first transfer for transferring the set of odd numbered column picture-elements of one-half of one scanning and a second transfer for transferring the set of even numbered column picture-elements of one-half of one scanning.

16. A recording system according to claim 15, wherein said recording means shifts a driving timing of the recording elements in a direction of a main scanning when recording the set of odd numbered column picture elements and when recording the set of even numbered column picture-elements.

17. A recording system according to claim 15, wherein the recording medium is moved after each record scanning in the direction of sub-scanning by one-half of a width of the recording scanning.

18. A recording system according to claim 15, wherein said storage means stores a set of split picture-element data by splitting a storage area to store the set of odd numbered column picture-elements separately from the set of even numbered column picture-elements.

19. A recording system according to claim 18, wherein a first group of recording elements refers to one of the sets of split picture-elements, and a second group of recording elements refers to the other of the sets of split picture-elements in said storage means.

20. A recording system according to claim 18, wherein the first transfer for transferring the set of odd numbered column picture-elements of one scanning and the second transfer for transferring the set of even numbered column picture-elements of one scanning by said split transfer means splits recording an image in the direction of the sub-scanning by one-half of the one scanning.

21. A recording system according to claim 18, wherein said recording means records split picture-element data stored in said storage means to complete an image with a plurality of record scannings.

22. A recording system according to claim 12, wherein said recording means splits a plurality of recording elements into a first group of recording elements for recording odd numbered columns and a second group of recording elements for recording even numbered columns.

23. A recording system according to claim 22, wherein the recording medium is moved after each record scanning in the direction of the sub-scanning by one-half of a width of the record scanning.

24. A recording system according to claim 1, wherein said picture-element data splitting means splits the picture element data in the direction of main scanning by every multiple of (n+k)th picture element where n is a fixed number of 1 or more and k is an integer between 0 and (n−1).

25. A recording system according to claim 24, wherein said split transfer means sequentially transfers the (multiple of n+k)th picture elements by one scanning.

26. A recording system according to claim 24, wherein the transfer of said n-th split picture element data and the transfer of said the (multiple of n+k)th picture element data in said split transfer means splits the recording image in the direction of the sub-scanning by only k/n of one scanning.

27. A recording system according to claim 24, wherein said recording means shifts a driving timing of the recording elements equal to k picture elements by a recording resolution in the direction of main scanning at the time of recording n-th picture element and at the time of recording (multiple of n+k)th picture element.

28. A recording system according to claim 24, wherein the split number n in said picture-element data splitting means is a number resulting from the division of a resolution of the image data by a maximum recording resolution which can be recorded by one record scanning by recording within the storage capacity of said storage means.

29. A recording system according to claim 24, further comprising a means for transmitting information about the maximum recording resolution which can be recorded by one record scanning by recording within the storage capacity of said storage means.

30. A recording system according to claim 24, further comprising means for transmitting information about the split number n in said picture-element data splitting means to a main body side of the recording apparatus.

31. A recording system according to claim 24, further comprising means for transmitting information about k of the (multiple of n+k)th picture element group to a main body side of the recording apparatus.

32. A recording system according to claim 24, wherein said recording means records split picture-element data stored in said storage means to complete an image with a plurality of record scannings.

33. A recording system according to claim 1, wherein the recording head is an ink-jet head which ejects ink to form images on a recording medium.

34. A recording system according to claim 33, wherein the recording elements are thermal energy producing means for applying thermal energy to the ink and wherein the recording elements allow the ink to cause a state change due to heating and eject the ink based on the state change.

35. A recording control method for a recording apparatus mounting a recording head having a plurality of recording elements arranged thereon and driving the recording elements while scanning the recording head in a direction of main scanning based on recording data held by a recording data holding means to form dots on a recording medium, said recording control method comprising the steps of:

obtaining a set of first split image data corresponding to a first split image and including column data separated by a predetermined number of columns to the recording data holding means;

controlling the recording apparatus to perform a first recording operation to form dots at predetermined intervals based on the first split image data held by the recording data holding means;

obtaining a set of second split image data different from the first split image data, corresponding to a second split image, and including column data separated by a predetermined number of columns to the recording data holding means; and controlling the recording apparatus to perform a second recording operation to form dots at predetermined intervals based on the second split image data while shifting the recording positions in the direction of main scanning by intervals shorter than the predetermined dot intervals with respect to the recording position recorded by said first recording step.

36. A recording control method according to claim 35, wherein the recording head is an ink-jet head which ejects ink to form images on a recording medium.

37. A recording control method according to claim 36, wherein the recording elements are thermal energy producing means for applying thermal energy to the ink and wherein the recording elements allow the ink to cause a state change due to heat and eject the ink based on the state change.

38. A recording control apparatus for a recording apparatus mounting a recording head having a plurality of recording elements arranged thereon and driving the recording elements while scanning the recording head in the direction of a main scanning based on recording data held by a recording data holding means to form dots on a recording medium, said recording control apparatus comprising:

recording data splitting means for separating recording data to be recorded with reference to a recording area of the recording head at intervals of a predetermined number of the picture elements to obtain a plurality of sets of split recording data;

data transfer means for transferring the plurality of sets of split recording data split by said recording data splitting means; and control means for controlling said recording apparatus to perform the recording operation at every time when a set of split recording data transferred by said data transfer means is held by the recording data holding means, and for changing the recording positions of a portion of the plurality of sets of split recording data in accordance with the predetermined number.

39. A recording control apparatus according to claim 38, wherein the recording head is an ink-jet head which ejects ink to form images on a recording medium.

40. A recording control apparatus according to claim 39, wherein the recording elements are thermal energy producing means for applying thermal energy to the ink and wherein said recording elements allow the ink to cause a state change due to heat and eject the ink based on the state change.

41. A recording apparatus comprising:

a recording head for recording data, said recording head having a plurality of recording elements arranged thereon;

recording data holding means for holding recording data;

recording means for forming dots on a recording medium based on the recording data held by said recording data holding means by driving said plurality of recording elements of said recording head while scanning said recording head in a direction of main scanning;

recording position control means for controlling a recording position in the direction of the main scanning by a recording control means; and recording control means for controlling said recording head, said recording data holding means, said recording means for forming dots and said recording position control means, wherein said recording control means comprises recording data splitting means for separating recording data to be recorded with reference to a recording area of said recording head at intervals of a predetermined number of the picture elements to obtain a plurality of sets of split recording data, data transfer means for transferring the plurality of sets of split recording data split by said recording data splitting means, and control means for controlling said recording apparatus to perform the recording operation at every time when a set of split recording data transferred by said data transfer means is held by said recording data holding means, and for changing the recording positions of a portion of the plurality of sets of split recording data in accordance with the predetermined number.

42. A recording apparatus according to claim 41, wherein said recording head is an ink-jet head which ejects ink to form images on a recording medium.

43. A recording apparatus according to claim 42, wherein the recording elements are thermal energy producing means for applying thermal energy to the ink and wherein the recording elements allow the ink to cause a state change due to heat and eject the ink based on the state change.

44. A data transferring method for transferring recording data having a resolution higher than a predetermined resolution to a recording apparatus usable with a recording head having a plurality of recording elements arranged thereon, and for driving the recording elements while scanning the recording head in a predetermined direction based on recording data stored in a memory to form dots on a recording medium, the memory storing recording data for recording a scanned area with the predetermined resolution, the method comprising the steps of:

splitting and separately storing recording data having a resolution higher than a predetermined resolution into at least two sets of split recording data corresponding to a plurality of images, wherein each set of the at least two sets of split recording data corresponds to the dots indicated by the recording data which are split by a predetermined number of dots in the predetermined direction; and transferring each of the at least two sets of split recording data corresponding to the plurality of images to the recording apparatus.

45. The data transferring method of claim 44, wherein the recording data is split into a first set of split recording data corresponding to odd numbered columns in an image to be recorded, and a second set of split recording data corresponding to even numbered columns in an image to be recorded.

46. The data transferring method of claim 45, wherein the first set of split recording data and the second set of split recording data are alternately transferred to the recording apparatus.

47. The data transferring method of claim 44, wherein a set of split odd numbered column picture-element data is transferred, and a set of split even number column picture-element data is transferred to the recording apparatus.

48. The data transferring method of claim 47, wherein a driving timing for recording in a direction of a main scanning is offset when recording the set of split odd numbered column picture-element data and when recording the set of split even numbered column picture-element data.

* * * * *

UNITED STATES PATENT AND TRADEMARK OFFICE
CERTIFICATE OF CORRECTION

PATENT NO. : 6,086,184
DATED : July 11, 2000
INVENTOR(S) : Osamu Iwasaki et al.

It is certified that error appears in the above-identified patent and that said Letters Patent is hereby corrected as shown below:

<u>Title page,</u>
<u>Abstract,</u>
Line 1, "which" should be deleted;
Line 9, "means." should read -- device. --;
Line 10, "means" should read -- device --;
Line 12, "where" should read -- not subjected to --; and
Line 13, "processing is not subjected thereto." should read -- processing. --.

<u>Column 1,</u>
Line 15, "Reacted" should read -- Related --.

<u>Column 4,</u>
Line 12, "opposes" should read -- are situated opposite --.

<u>Column 8,</u>
Line 66, "of" should be deleted.

<u>Column 11,</u>
Line 15, "are" should read -- is --.

<u>Column 14,</u>
Line 56, "FIGS." should read -- to FIGS. --.

<u>Column 17,</u>
Lines 29-31, "The typical structure and the operational principle of preferably the one disclosed in U.S. Pat. Nos. 4,723,129 and 4,740,796." should read -- A typical structure and operational principle of a bubble jet recording head and apparatus are disclosed in U.S. Patent Nos. 4,723,129 and 4,740,796. --

<u>Column 19,</u>
Line 53, "offset" should be deleted.

UNITED STATES PATENT AND TRADEMARK OFFICE
CERTIFICATE OF CORRECTION

PATENT NO. : 6,086,184
DATED : July 11, 2000
INVENTOR(S) : Osamu Iwasaki et al.

It is certified that error appears in the above-identified patent and that said Letters Patent is hereby corrected as shown below:

Column 20,
Line 37, "offset" should be deleted;
Line 46, "offset" should be deleted; and
Line 67, "by splitting a storage area" should be deleted.

Column 21,
Line 38, "said" should be deleted.

Signed and Sealed this

Twenty-seventh Day of November, 2001

Attest:

NICHOLAS P. GODICI
*Attesting Officer*     *Acting Director of the United States Patent and Trademark Office*